(12) United States Patent
Jeon et al.

(10) Patent No.: US 12,506,866 B2
(45) Date of Patent: Dec. 23, 2025

(54) METHOD AND APPARATUS FOR VIDEO CODING USING ADAPTIVE ORDER OF INTRA SUB-PARTITIONS

(71) Applicants: HYUNDAI MOTOR COMPANY, Seoul (KR); KIA CORPORATION, Seoul (KR); RESEARCH & BUSINESS FOUNDATION SUNGKYUNKWAN UNIVERSITY, Suwon-si (KR)

(72) Inventors: Byeung Woo Jeon, Seongnam-si (KR); Bum Yoon Kim, Yongin-si (KR); Jee Yoon Park, Seoul (KR); Jee Hwan Lee, Gwacheon-si (KR); Jin Heo, Yongin-si (KR); Seung Wook Park, Yongin-si (KR)

(73) Assignees: HYUNDAI MOTOR COMPANY, Seoul (KR); KIA CORPORATION, Seoul (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 0 days.

(21) Appl. No.: 18/368,756

(22) Filed: Sep. 15, 2023

(65) Prior Publication Data
US 2024/0007624 A1 Jan. 4, 2024

Related U.S. Application Data

(63) Continuation of application No. PCT/KR2022/003783, filed on Mar. 17, 2022.

(30) Foreign Application Priority Data

Mar. 19, 2021 (KR) .................. 10-2021-0035972
Dec. 1, 2021 (KR) .................. 10-2021-0170419
Mar. 16, 2022 (KR) .................. 10-2022-0032822

(51) Int. Cl.
*H04N 19/119* (2014.01)
*H04N 19/159* (2014.01)
(Continued)

(52) U.S. Cl.
CPC ......... *H04N 19/119* (2014.11); *H04N 19/159* (2014.11); *H04N 19/176* (2014.11); *H04N 19/46* (2014.11); *H04N 19/88* (2014.11)

(58) Field of Classification Search
None
See application file for complete search history.

(56) References Cited

U.S. PATENT DOCUMENTS 9,100,621 B2 8/2015 Jeon et al.
9,661,332 B2 5/2017 Jeon et al.
(Continued)

FOREIGN PATENT DOCUMENTS

KR 20190068517 A 6/2019
KR 20200013766 A 2/2020
(Continued)

OTHER PUBLICATIONS

International Search Report and Written Opinion cited in corresponding international app No. PCT/KR2022/003783; Jul. 5, 2022; 9 pp.

*Primary Examiner* — Kaitlin A Retallick
(74) *Attorney, Agent, or Firm* — Lempia Summerfield Katz LLC

(57) ABSTRACT

A video coding method and an apparatus using an adaptive order of intra sub-partitions are provided. The video coding method and apparatus adaptively determine an encoding/decoding order of subblocks based on at least one of a shape of the subblock, a size of the subblock, a sub-splitting (Continued)

direction, and a prediction mode in performing intra prediction of the subblocks split from a current block using an ISP mode.

14 Claims, 26 Drawing Sheets

(51) Int. Cl.
  *H04N 19/176* (2014.01)
  *H04N 19/46* (2014.01)
  *H04N 19/88* (2014.01)

(56) References Cited

U.S. PATENT DOCUMENTS

| | | | |
|---|---|---|---|
| 9,832,472 | B2 | 11/2017 | Jeon et al. |
| 10,469,844 | B2 | 11/2019 | Jeon et al. |
| 10,785,487 | B2 | 9/2020 | Jeon et al. |
| 10,798,375 | B2 | 10/2020 | Piao et al. |
| 10,812,808 | B2 | 10/2020 | Jeon et al. |
| 11,102,491 | B2 | 8/2021 | Jeon et al. |
| 11,297,309 | B2 | 4/2022 | Kim |
| 11,405,605 | B2 | 8/2022 | Piao et al. |
| 11,463,694 | B2 | 10/2022 | De Luxán Hernández et al. |
| 11,677,961 | B2 | 6/2023 | Jeon et al. |
| 11,695,918 | B2 | 7/2023 | Piao et al. |
| 2013/0272623 | A1 | 10/2013 | Lim et al. |
| 2015/0271503 | A1 | 9/2015 | Jeon et al. |
| 2017/0078674 | A1 | 3/2017 | Jeon et al. |
| 2018/0054618 | A1 | 2/2018 | Jeon et al. |
| 2018/0324434 | A1* | 11/2018 | Piao .............. H04N 19/176 |
| 2019/0098318 | A1 | 3/2019 | Jeon et al. |
| 2019/0281285 | A1 | 9/2019 | Piao et al. |
| 2019/0297330 | A9 | 9/2019 | Jeon et al. |
| 2019/0373269 | A1 | 12/2019 | Jeon et al. |
| 2020/0213598 | A1 | 7/2020 | Jeon et al. |
| 2020/0252608 | A1* | 8/2020 | Ramasubramonian ............ H04N 19/59 |
| 2020/0359014 | A1 | 11/2020 | Piao et al. |
| 2020/0359015 | A1 | 11/2020 | Piao et al. |
| 2021/0006778 | A1 | 1/2021 | Kim |
| 2021/0136373 | A1 | 5/2021 | De et al. |
| 2021/0344933 | A1* | 11/2021 | Jeon .............. H04N 19/176 |
| 2022/0014741 | A1* | 1/2022 | Xiu .............. H04N 19/70 |
| 2022/0182602 | A1* | 6/2022 | Kim .............. H04N 19/157 |
| 2023/0025784 | A1 | 1/2023 | De Luxán Hernández et al. |

FOREIGN PATENT DOCUMENTS

| | | |
|---|---|---|
| KR | 20210011516 A | 2/2021 |
| KR | 20210027477 A | 3/2021 |
| WO | 2021040330 A1 | 3/2021 |

* cited by examiner

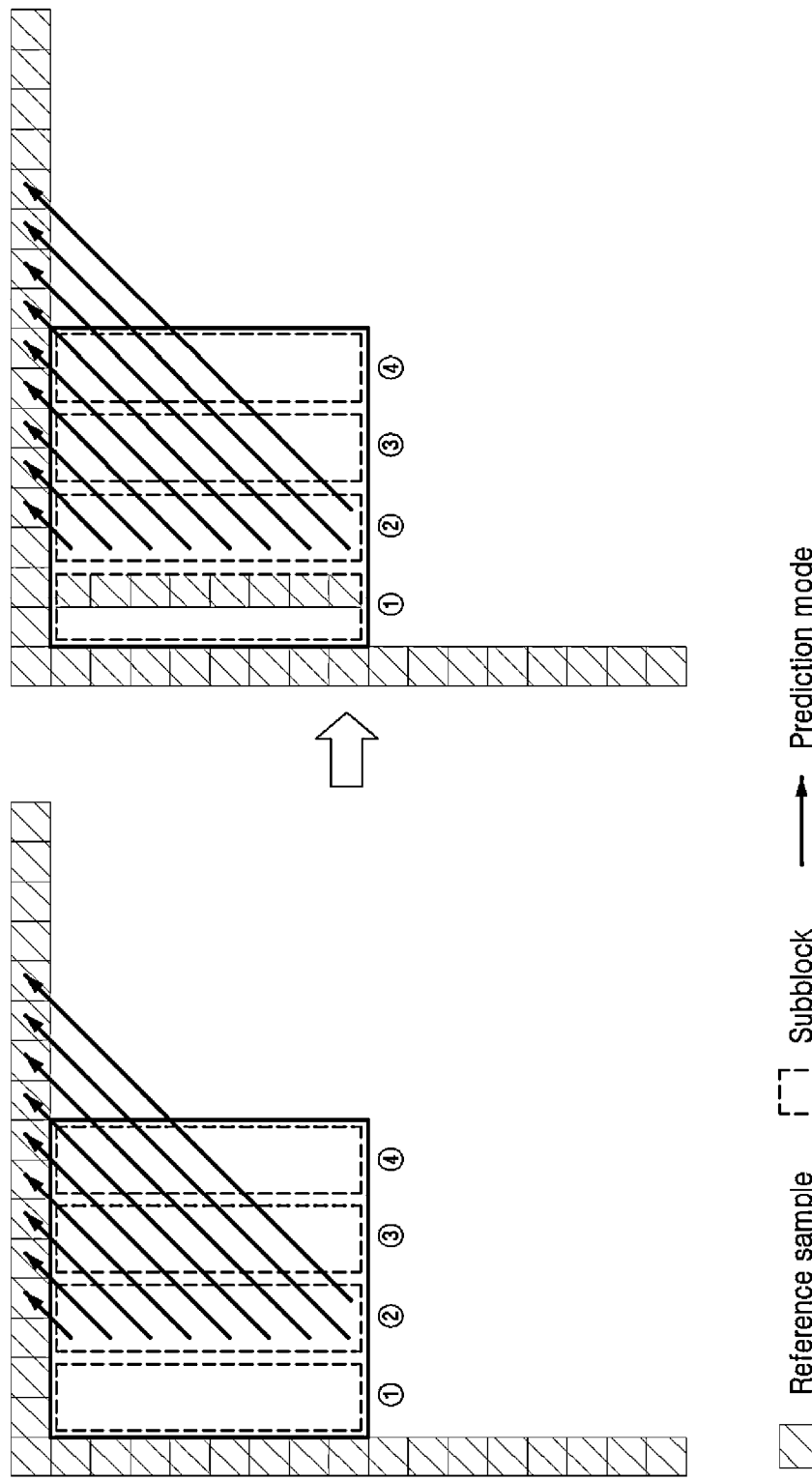

Prediction mode: No. 34 prediction mode: No. 40

Prediction mode: No. 44

☐ Current block
▨ Restored reference sample
◩ Rearranged reference sample
→ Prediction mode

METHOD AND APPARATUS FOR VIDEO CODING USING ADAPTIVE ORDER OF INTRA SUB-PARTITIONS

CROSS-REFERENCE TO RELATED APPLICATIONS

This application is a Continuation of International Application No. PCT/KR2022/003783 filed on Mar. 17, 2022, which claims the benefit of and priority to Korean Patent Application No. 10-2021-0035972 filed on Mar. 19, 2021, Korean Patent Application No. 10-2021-0170419 filed on Dec. 1, 2021, and Korean Patent Application No. 10-2022-0032822 filed on Mar. 16, 2022, the entire disclosures of each of which are hereby incorporated herein by reference.

TECHNICAL FIELD

The present disclosure relates to a video coding method and an apparatus using an adaptive order of intra sub-partitions.

BACKGROUND

The statements in this section merely provide background information related to the present disclosure and do not necessarily constitute prior art.

Because video data has a large amount of data compared to audio or still image data, a lot of hardware resources, including memory, are needed to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/AVC, High Efficiency Video Coding (HEVC), and Versatile Video Coding (VVC), which has improved coding efficiency by about 30% or more compared to HEVC.

However, as the image size, resolution, and frame rate of video data gradually increase, the amount of data to be encoded also increases. Accordingly, a new compression technique providing higher coding efficiency and an improved image enhancement effect than existing compression techniques is desired.

In video coding, when an image is split into coding units (CUs) units and encoded per CU basis, all pixels in a coding target block are intra-predicted using one prediction mode. Therefore, because a distance from a reference pixel may be increased, a large amount of energy may still exist in a residual signal to be coded. A problem of energy present in the residual signal may be particularly serious in the case of a rectangular block in which a distance between a pixel to be predicted and the reference pixel is horizontally (or vertically) long or a large block. In order to solve this problem, the block can be further sub-split, but there is a problem in that an overhead for transmitting the intra prediction mode for each sub-split block increases.

There exists a technology for solving the problem of increasing overhead. In order to reduce the overhead while increasing intra prediction efficiency, a block to be encoded is evenly split into small blocks once more and prediction is performed, and only one prediction mode may be transmitted on a per original block before sub-splitting and may be commonly used for small sub-split blocks. This related art is called Intra Sub-Partitions (ISP) technology or ISP mode.

In an ISP technology of the related art, one intra prediction mode is signaled for a current block so that the overhead associated with mode transmission is reduced, but intra prediction is performed on each sub-split block and there is an advantage that the prediction can be performed by using closer reference pixels compared to a case in which the ISP is not used. However, although there are closer reference pixels depending on a prediction direction and a shape of the sub-split block, the reference pixels cannot be appropriately used in some cases. A root cause of this problem is that an encoding order is set in advance so that sub-split blocks are always encoded from left to right or from top to bottom. In other words, when reference pixels closer to a current subblock are not located in a previous coding direction in the encoding order, the reference pixels cannot be appropriately used.

SUMMARY

Embodiments of the present disclosure provide an application method for an ISP technology capable of effectively overcoming such a problem in terms of image quality improvement.

Embodiments of the present disclosure provide a video coding method and an apparatus for adaptively determining an encoding/decoding order of subblocks based on at least one of a shape of the subblock, a size of the subblock, a sub-splitting direction, and a prediction mode in performing intra prediction of the subblocks split from a current block using an ISP mode.

In at least one aspect of the present disclosure, an intra prediction method for subblocks split from a current block is provided. The intra prediction method may be performed by a video decoding apparatus. The intra prediction method includes decoding a subblock partition direction flag, an intra prediction mode of the current block, and a size of the current block from a bitstream, the subblock partition direction flag indicating whether a sub-splitting direction of the current block is a horizontal direction or a vertical direction. The intra prediction method also includes inputting the subblock partition direction flag, the intra prediction mode of the current block, and the size of the current block to an order determiner, and determining a decoding order of the subblocks by selecting one of a default order and a reverse order according to an order determination flag generated by the order determiner. The intra prediction method additionally includes generating the subblocks by splitting the current block based on the subblock partition direction flag and the size of the current block. The intra prediction method further includes generating a predictor of each subblock by applying the intra prediction mode to the subblocks in the decoding order.

In another aspect of the present disclosure, a video decoding apparatus is provided The video decoding apparatus includes an entropy decoder configured to decode a subblock partition direction flag, an intra prediction mode of a current block, and a size of the current block from a bitstream, the subblock partition direction flag indicating whether a sub-splitting direction of the current block is a horizontal direction or a vertical direction. The video decoding apparatus also includes an intra predictor including an order determiner. The intra predictor is configured to input the subblock partition direction flag, the intra prediction mode, and the size of the current block to the order determiner, and determine a decoding order of the subblocks by selecting one of a default order and a reverse order to according to an order determination flag generated by the order determiner. The intra predictor is also configured to generate the subblocks by splitting the current block based on the subblock partition direction flag and the size of the current block, and generate a predictor of each subblock by applying the intra prediction mode to the subblocks in the decoding order.

In yet another aspect of the present disclosure, an intra prediction method for subblocks split from a current block is provided. The intra prediction method may be performed by a video encoding apparatus. The intra prediction method includes acquiring a subblock partition direction flag, an intra prediction mode of the current block, and a size of the current block from a high level, the subblock partition direction flag indicating whether a sub-splitting direction of the current block is a horizontal direction or a vertical direction. The intra prediction method also includes inputting the subblock partition direction flag, the intra prediction mode of the current block, and the size of the current block to an order determiner, and determining an encoding order of the subblocks by selecting one of a default order and a reverse order according to an order determination flag generated by the order determiner. The intra prediction method additionally includes generating the subblocks by splitting the current block based on the subblock partition direction flag and the size of the current block. The intra prediction method further includes generating a predictor of each subblock by applying the intra prediction mode to the subblocks in the encoding order.

As described above, embodiments of the present disclosure provide a video coding method and an apparatus for adaptively determining an encoding/decoding order of subblocks based on at least one of a shape of the subblock, a size of the subblock, a sub-splitting direction, and a prediction mode in performing intra prediction of the subblocks split from a current block using an ISP mode, to improve coding efficiency and enhance picture quality.

BRIEF DESCRIPTION OF THE DRAWINGS

The above and other objects, features and advantages of the present disclosure should be more apparent from the following detailed description taken in conjunction with the accompanying drawings.

FIGS. 7A and 7B are other illustrative diagrams illustrating the sequential encoding of the subblocks.

DETAILED DESCRIPTION

Figure 1:
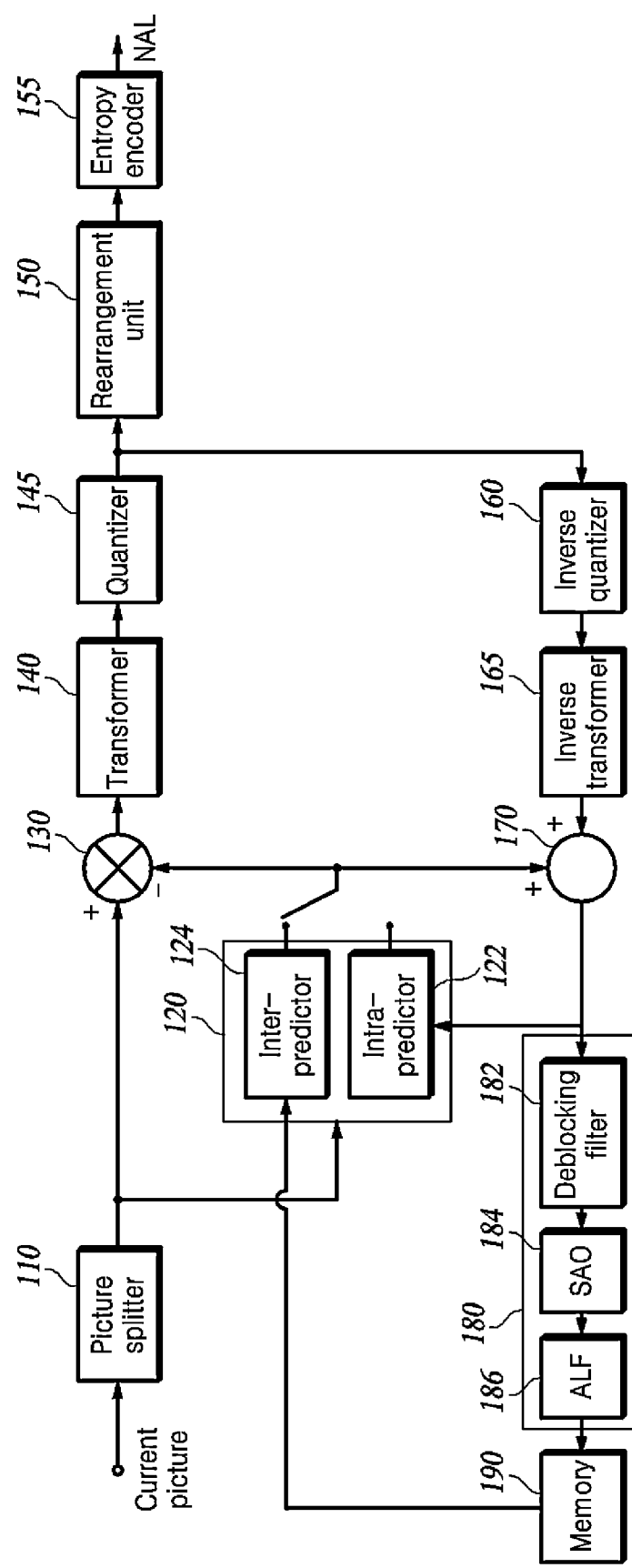
FIG. 1 is a block diagram of a video encoding apparatus that may implement the techniques of the present disclosure.

Hereinafter, embodiments of the present disclosure are described in detail with reference to the accompanying illustrative drawings. In the accompanying drawings, like reference numerals designate like elements, although the elements may be shown in different drawings. Further, in the following description, detailed descriptions of related known components and functions, when considered to obscure the subject of the present disclosure, may be omitted for the purpose of clarity and for brevity.

When a component, device, element, or the like of the present disclosure is described as having a purpose or performing an operation, function, or the like, the component, device, or element should be considered herein as being "configured to" meet that purpose or perform that operation or function.

FIG. 1 is a block diagram of a video encoding apparatus that may implement technologies of the present disclosure, according to an embodiment. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may be implemented to execute the function of the software corresponding to each component.

One video is constituted by one or more sequences including a plurality of pictures. Each picture is split into a plurality of areas, and encoding is performed for each area. For example, one picture is split into one or more tiles and/or slices. One or more tiles may be defined as a tile group. Each tile and/or slice is split into one or more coding tree units (CTUs). Each CTU is split into one or more coding units (CUs) by a tree structure. Information applied to each CU is encoded as a syntax of the CU and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information that the plurality of pictures commonly refers to is encoded to a sequence parameter set (SPS). In addition, information that one or more SPS commonly refer to is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of CTU. Information on the size of the CTU (CTU size) is encoded as the syntax of the SPS or the PPS and delivered to a video decoding apparatus.

The picture splitter 110 splits each picture constituting the video into a plurality of CTUs having a predetermined size and then recursively splits the CTU by using a tree structure. A leaf node in the tree structure becomes the CU, which is a basic unit of encoding.

The tree structure may be a quadtree (QT) in which a higher node (or a parent node) is split into four lower nodes (or child nodes) having the same size. As another example, the tree structure may be a binarytree (BT) in which the higher node is split into two lower nodes. As yet another example, the tree structure may be a ternarytree (TT) in which the higher node is split into three lower nodes at a ratio of 1:2:1. As still another example, the tree structure may be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. A BTTT may be added to the tree structures to be referred to as a multiple-type tree (MTT).

Figure 2:
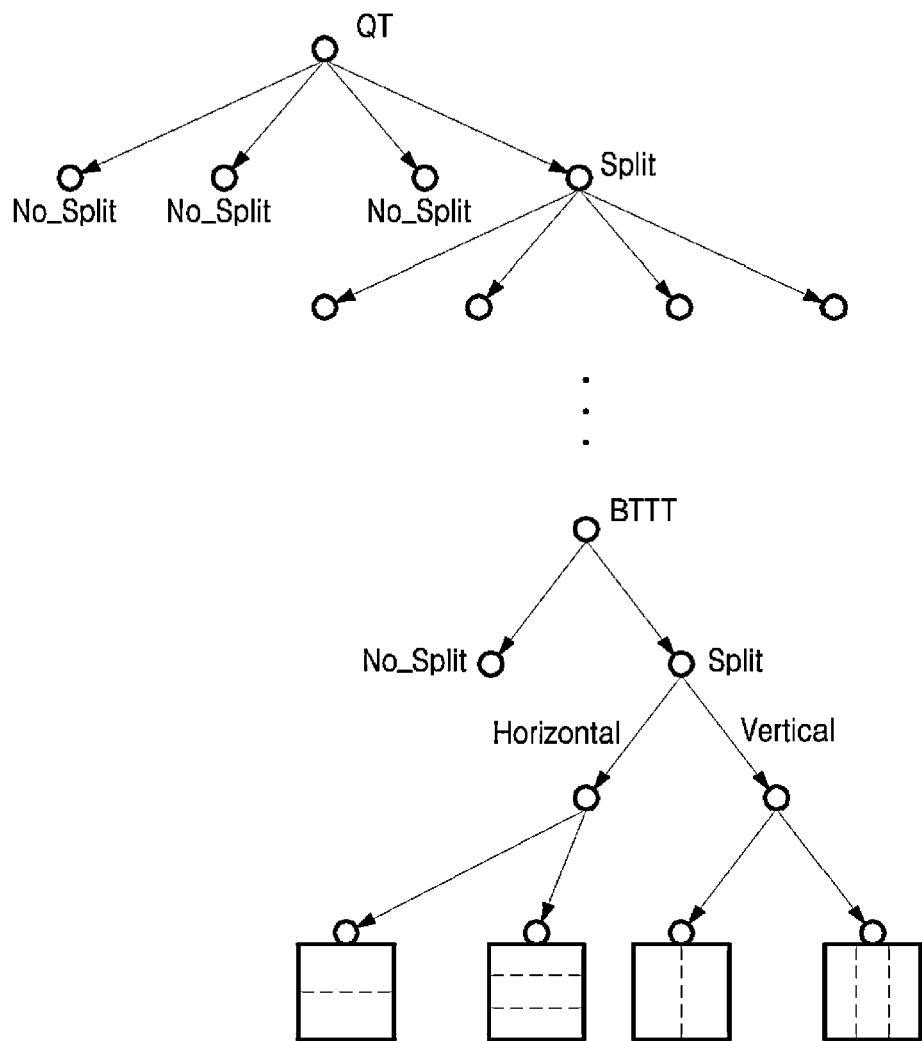
FIG. 2 illustrates a method for partitioning a block using a quadtree plus binarytree ternarytree (QTBTTT) structure.

FIG. 2 is a diagram for describing a method for splitting a block by using a QTBTTT structure.

As illustrated in FIG. 2, the CTU may first be split into the QT structure.

Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, e.g., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, e.g., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. A type in which the block of the corresponding node is split into two blocks of a form of being asymmetrical to each other may be additionally present. The asymmetrical form may include a form in which the block of the corresponding node is split into two rectangular blocks having a size ratio of 1:3 and/or may include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block". As the QTBTTT splitting is adopted, a shape of the current block may be a rectangular shape or a square shape.

The predictor 120 predicts the current block to generate a prediction block. The predictor 120 includes an intra predictor 122 and an inter predictor 124.

In general, each of the current blocks in the picture may be predictively coded. The prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
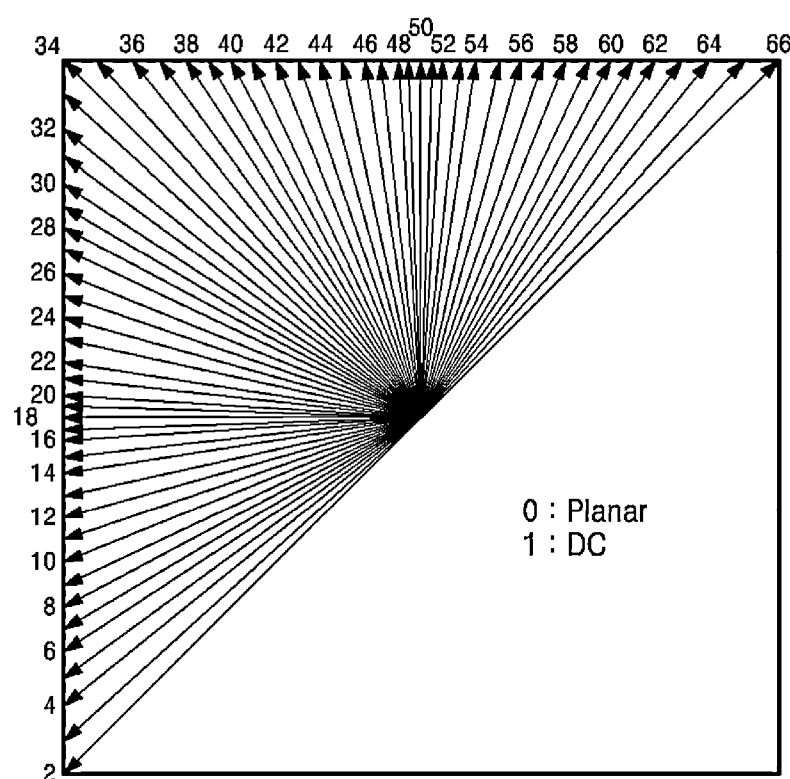
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode. The plurality of intra prediction modes may also include 65 directional modes. A neighboring pixel and an arithmetic equation to be used are defined differently according to each prediction mode.

Figure 3B:
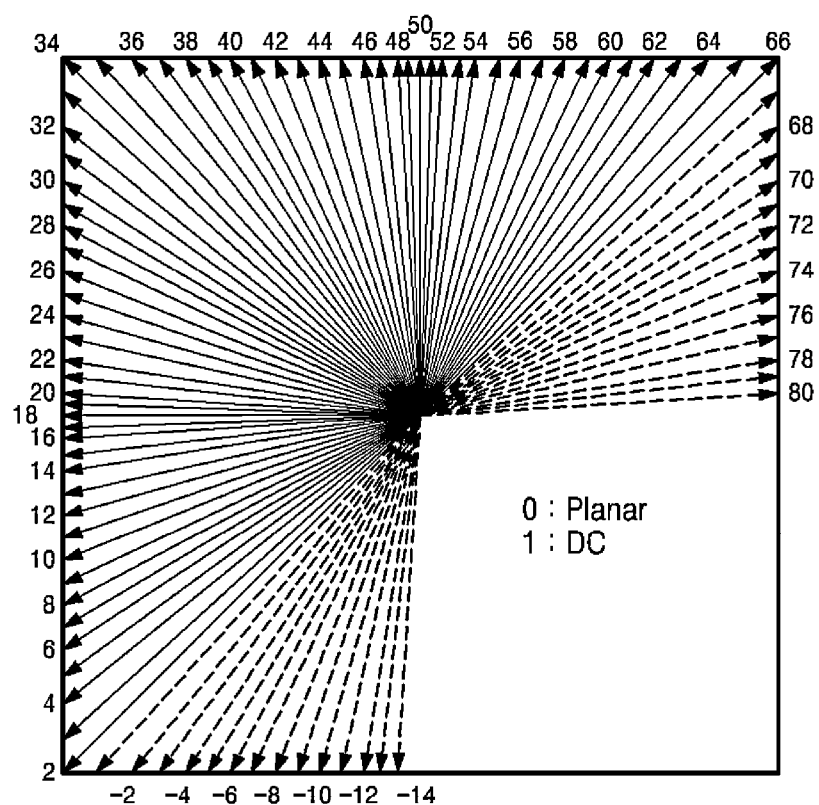

For efficient directional prediction for the current block having a rectangular shape, directional modes (#67 to #80, intra prediction modes #−1 to #−14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and also select an appropriate intra prediction mode to be used from tested modes. For example, the intra predictor 122 may calculate rate-distortion values by using a rate-distortion analysis for multiple tested intra prediction modes and also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current bock in the current picture and the prediction block in the reference picture. In general, motion estimation may be performed for a luma component, and a motion vector calculated based on the luma component is used for both the luma component and a chroma component. Motion information including information the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, etc. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference as described below.

The inter predictor 124 may perform inter prediction by using bi-prediction. In the case of bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block may be generated by averaging or weighted-averaging the first reference block and the second reference block. Motion information including information on two reference pictures used for predicting the current block and information on two motion vectors is delivered to the entropy encoder 155. Reference picture list 0 may be constituted by pictures before the current picture in a display order among pre-restored pictures, and reference picture list 1 may be constituted by pictures after the current picture in the display order among the pre-restored pictures. However, although not particularly limited thereto, the pre-restored pictures after the current picture in the display order may be additionally included in reference picture list 0. Inversely, the pre-restored pictures before the current picture may be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
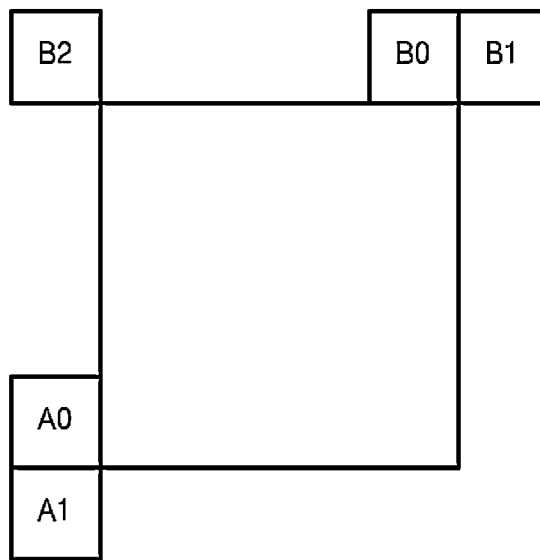
FIG. 4 illustrates neighboring blocks of a current block.

As a neighboring block for deriving the merge candidate, all or some of a left block A0, a bottom left block μl, a top block B0, a top right block B1, and a top left block B2 adjacent to the current block in the current picture may be used as illustrated in FIG. 4. Further, a block positioned within the reference picture (which may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector may be added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

A merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block µl, a top block B0, a top right block B1, and a top left block B2 adjacent to the current block in the current picture illustrated in FIG. 4 may be used. Further, a block positioned within the reference picture (which may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector may be added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, etc.) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

The motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit. In another embodiment, the transformer 140 may split the residual block into a plurality of subblocks and perform the transform by using the subblock as the transform unit. Alternatively, the residual block is divided into two subblocks, which are a transform area and a non-transform area, to transform the residual signals by using only the transform area subblock as the transform unit. The transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. As another example, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

The transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. In another embodiment, the quantizer 145 may immediately quantize the related residual block without the transform for any block or frame. In an embodiment, the quantizer 145 may apply different quantization coefficients (scaling values) according to positions of the transform coefficients in the transform block. A quantization matrix applied to transform coefficients quantized arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may be used instead of the zig-zag scan. In an embodiment, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information such as a CTU size, a CTU split flag, a QT split flag, an MTT split type, an MTT split direction, etc., related to the block splitting to allow the video decoding apparatus to split the block in the same manner as the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to restore the residual block.

The adder 170 adds the restored residual block and the prediction block generated by the predictor 120 to restore the current block. Pixels in the restored current block may be used as reference pixels when intra-predicting a next-order block.

The loop filter unit 180 performs filtering for the restored pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the restored blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the restored pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The restored block filtered by the deblocking filter 182, the SAO filter 184, and the ALF 186 is stored in the memory 190. When all blocks in one picture are restored, the restored picture may be used as a reference picture for inter predicting a block within a picture to be encoded afterwards.

Figure 5:
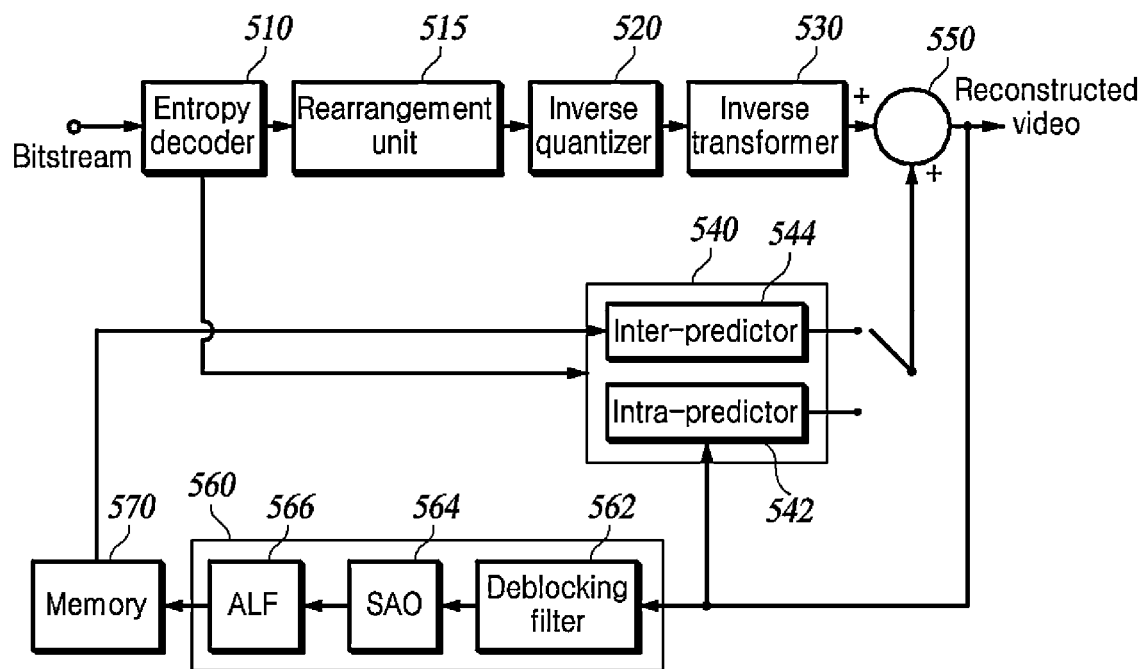
FIG. 5 is a block diagram of a video decoding apparatus that may implement the techniques of the present disclosure.

FIG. 5 is a functional block diagram of a video decoding apparatus that may implement the technologies of the present disclosure, according to an embodiment. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may be implemented to execute the function of the software corresponding to each component.

The entropy decoder 510 extracts information related to block splitting by decoding the bitstream generated by the video encoding apparatus to determine a current block to be decoded. The entropy decoder 510 also extracts prediction information required for restoring the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur or, on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT being further split into the BT, and split direction information are extracted.

When the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information, and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by restoring the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to restore the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include an intra predictor 542 and an inter predictor 544. The intra predictor 542 may be activated when the prediction type of the current block is the intra prediction, and the inter predictor 544 may be activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 restores the current block by adding the residual block output from the inverse transformer 530 and the prediction block output from the inter predictor 544 or the intra predictor 542. Pixels within the restored current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the restored blocks in order to remove the blocking artifact, which occurs due to block unit decoding. The SAO filter 564 and the ALF 566 perform additional filtering for the restored block after the deblocking filtering in order to compensate differences between the restored pixels and original pixels, which occur due to lossy coding. The filter coefficients of the ALF are determined by using information on filter coefficients decoded from the bitstream.

The restored block filtered by the deblocking filter 562, the SAO filter 564, and the ALF 566 is stored in the memory 570. When all blocks in one picture are restored, the restored picture may be used as a reference picture for inter predicting a block within a picture to be encoded afterwards.

The present disclosure in some embodiments relates to encoding and decoding video images as described above. More specifically, embodiments of the present disclosure provides a video coding method and an apparatus for adaptively determining an encoding/decoding order of subblocks based on at least one of a shape of the subblock, a size of the subblock, a sub-splitting direction, and a prediction mode in performing intra prediction of the subblocks split from a current block using an ISP mode.

The following embodiments may be applied to the intra predictor 122 in the video encoding apparatus. Further, the embodiments can be applied to the entropy decoder 510 and the intra predictor 542 in the video decoding apparatus.

In the following descriptions, the term 'target block' to be encoded/decoded may be used interchangeably with the current block or coding unit (CU) as described above, or it may refer to some area of the coding unit.

Hereinafter, a specific flag being true indicates that a value of the flag is 1, and the specific flag being false indicates that the value of the flag is 0.

Hereinafter, ISP, ISP technology and an ISP mode are used interchangeably.

I. Intra Prediction and Intra Sub-Partitions (ISP)

In a VVC technology, intra prediction modes of a luma block have sub-split directional modes (i.e., 2 to 66) in addition to non-directional modes (i.e.s, Planar and DC), as illustrated in FIG. 3a. Further, as added to the example of FIG. 3b, the intra prediction mode of the luma block has directional modes (−14 to −1 and 67 to 80) according to wide-angle intra prediction.

There are several technologies for improving the coding efficiency of intra prediction based on the prediction mode of the luma block of the current block. In the ISP technology, a current block is sub-split into small blocks having the same size, the intra prediction mode is shared among all the subblocks, but a transform may be applied to each subblock. The sub-splitting of the block may be performed in the horizontal direction or a vertical direction.

In the following description, a large block before being sub-split is referred to as a current block, and each of the small sub-split blocks is referred to as a subblock.

An operation of the ISP technology is as follows.

The video encoding apparatus signals intra_subpartitions_mode_flag indicating whether to apply ISP. The video encoding apparatus also signals intra_subpartitions_split_flag indicating a sub-partition method to the video decoding apparatus. The subpartition type IntraSubPartitionsSplitType according to intra_subpartitions_mode_flag and intra_subpartitions_split_flag is shown as Table 1.

TABLE 1

| IntraSubPartitionsSplitType | Name of IntraSubPartitionsSplitType |
|---|---|
| 0 | ISP_NO_SPLIT |
| 1 | ISP_HOR_SPLIT |
| 2 | ISP_VER_SPLIT |

The ISP technology sets a split type IntraSubPartitionsSplitType as follows.

When intra_subpartitions_mode_flag is 0, IntraSubPartitionsSplitType is set to 0, and subblock partition is not performed, i.e., the ISP is not applied (ISP_NO_SPLIT).

When intra_subpartitions_mode_flag is not 0, the ISP is applied. In this case, IntraSubPartitionsSplitType is set to a value of 1+intra_subpartitions_split_flag, and subblock partition is performed according to the split type. When IntraSubPartitionsSplitType=1, horizontal subblock partition (ISP_HOR_SPLIT) is performed. When IntraSubPartitionsSplitType=2, subblock partition is performed in a vertical direction (ISP_VER_SPLIT). Accordingly, intra_subpartitions_split_flag may indicate a subblock partition direction.

For example, when an ISP mode in which sub-splitting is performed in the horizontal direction is applied to the current block, IntraSubPartitionsSplitType is 1, intra_subpartitions_mode_flag is 1, and intra_subpartitions_split_flag is 0.

In the following description, intra_subpartitions_mode_flag is expressed as a subblock partition application flag, intra_subpartitions_split_flag is expressed as a subblock partition direction flag, and IntraSubPartitionsSplitType is expressed as a subblock partition type. Further, information including the subblock partition application flag and the subblock partition direction flag is referred to as ISP information.

As described above, when the size of the current block is too small in sub-splitting the current block in the horizontal or vertical direction, the coding efficiency of the split subblocks may be deteriorated, or the subblock is smaller than a minimum unit for transformation and the transformation itself may be impossible. To prevent such a case from occurring, ISP application may be limited by referring to the size of the subblock acquired after partition. For example, when the number of pixels of the split subblock is 16 or more, the sub-splitting may be applied. On the other hand, when the size of the current block is, for example, 4×4, the ISP is not applied. A block having a size of 4×8 or 8×4 can be split into two subblocks having the same shape and size, which is called Half_Split. Blocks having other sizes may be split into four subblocks having the same shape and size, which is called Quarter_Split.

Figure 6A:
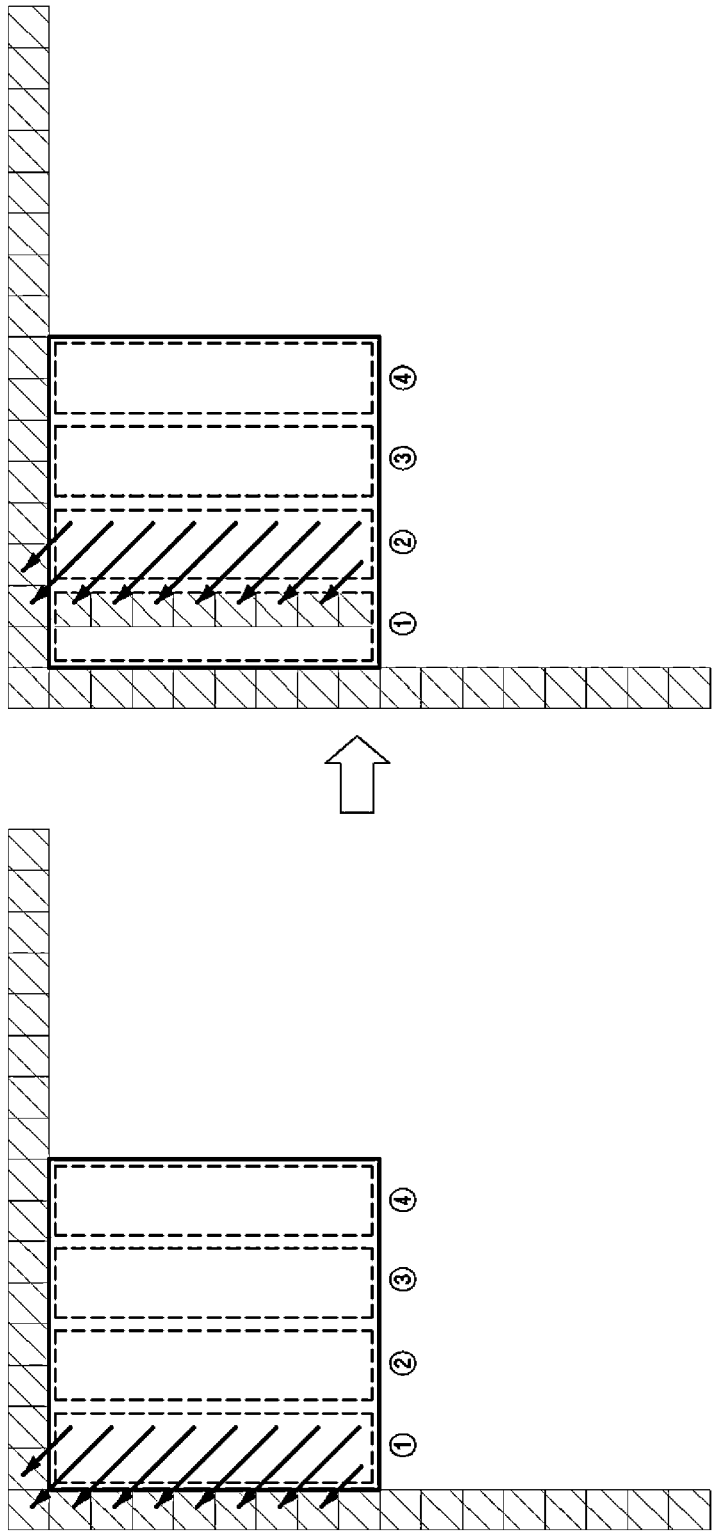
FIGS. 6A and 6B are illustrative diagrams illustrating sequential encoding of subblocks.
Figure 6B:
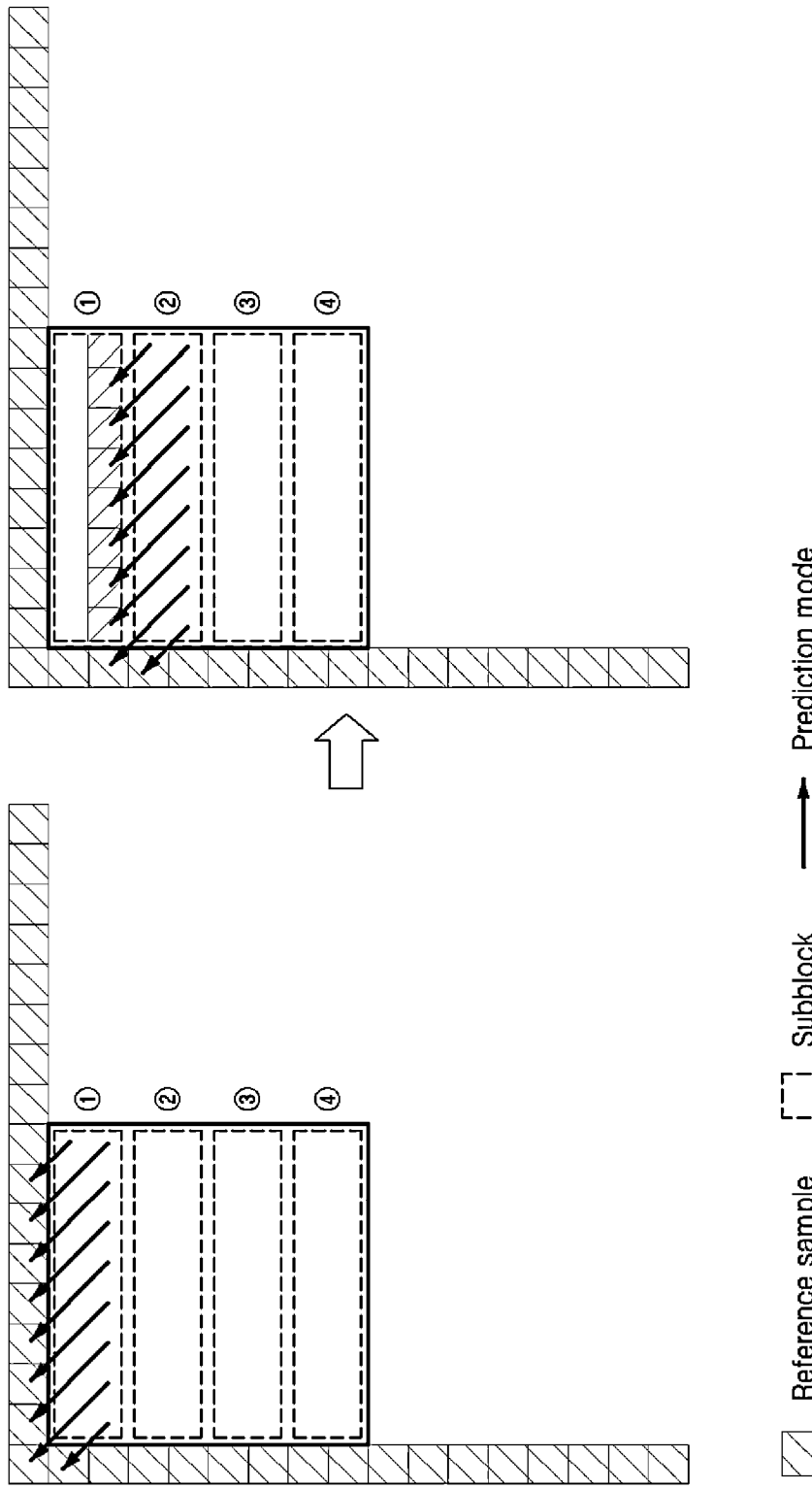

FIGS. 6A and 6B are illustrative diagrams illustrating sequential encoding of the subblocks.

The video encoding apparatus shares the same intra prediction information and sequentially encodes each subblock from left to right or from top to bottom. In the case of the subblocks that are quartered in the vertical direction, the subblocks are encoded from left to right, i.e., in an order of ①→②→③→④, as illustrated in FIG. 6A. In this case, in the intra prediction for encoding of each subblock, the video encoding apparatus may use rearranged samples in the encoded subblock as reference samples of the current subblock. In other words, when the subblock ② is encoded, the encoding of the subblock ① has already been completed. Therefore, the video encoding apparatus uses newly rearranged reference samples of the subblock ①, as illustrated in FIG. 6A, without using the pre-restored reference samples of adjacent CUs, so that prediction efficiency is improved. Similarly, in the case of the subblocks quartered in the horizontal direction, the subblocks are encoded from top to bottom, i.e., in the order ①→②→③→④ as illustrated in FIG. 6B. In this case, in intra prediction for encoding each subblock, the video encoding apparatus may use rearranged samples in the encoded subblock as reference samples of the current subblock. In the case of the subblocks bisected in the vertical or horizontal direction, the video encoding apparatus may perform intra prediction similarly to the quartered subblocks.

However, a current ISP technology in which subblocks share one prediction mode has an inefficient aspect. This inefficient aspect occurs especially when the direction indicated by the intra prediction mode is similar to an encoding direction.

Figure 7B:
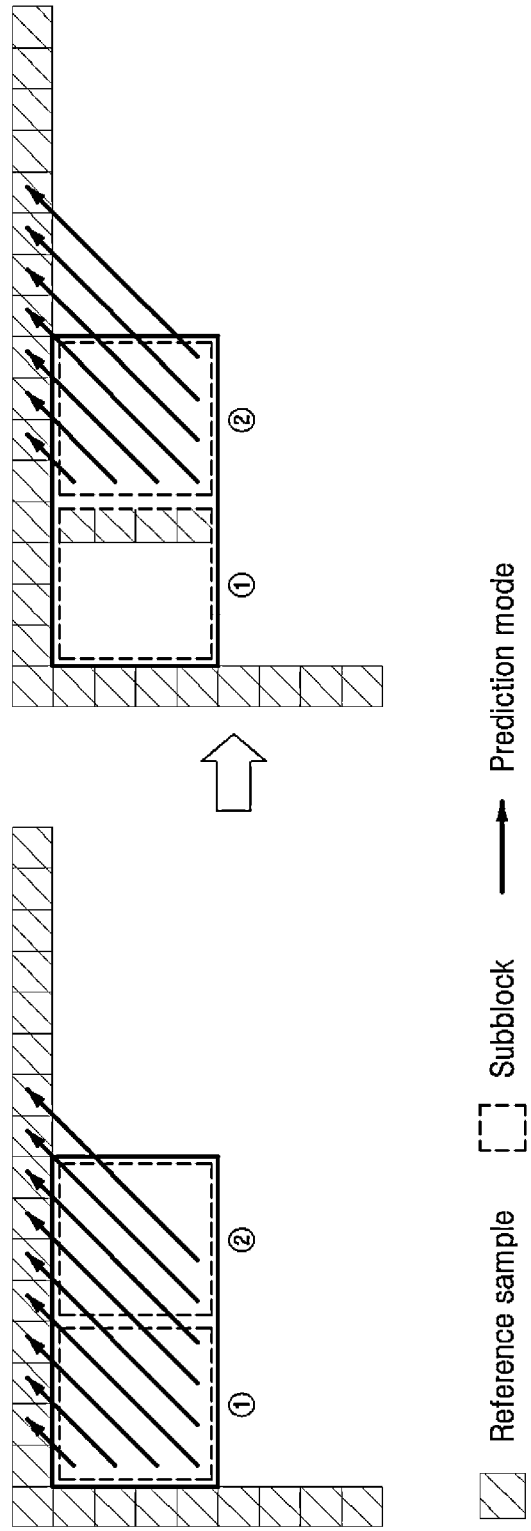

FIGS. 7A and 7B are other illustrative diagrams illustrating sequential encoding of the subblocks.

For example, as illustrated in FIGS. 7A and 7B, a case in which the current block is sub-split in the vertical direction and the prediction mode is number 66 is considered. When the prediction mode is number 66, reference samples located in a 45-degree direction, i.e., in an upper right direction, are used for intra prediction, as illustrated in FIG. 7A. In this case, the second and subsequent subblocks to be encoded may not use restored samples in the previously encoded subblock as reference samples in encoding the quartered subblocks in the order of ①→②→③→④ as illustrated in FIG. 7A. Further, a similar problem may occur in encoding bisected subblocks in the order of ①→②, as illustrated in FIG. 7B. In other words, when intra prediction is performed on each subblock, improvement in prediction efficiency by using closer reference samples, which is an original purpose of the ISP technology, may not be achieved at all.

A root cause of this problem is that, as described above, the encoding order is set in advance so that subblocks are always encoded from left to right or from top to bottom. Accordingly, an object of the present disclosure is to improve a compression rate or image quality of an image by adaptively determining an encoding order of a current block in order to solve the above problems, and specific realization examples are described hereinafter.

Hereinafter, embodiments of the present disclosure are described focusing on intra prediction using subblock partition of the video decoding apparatus. Such intra prediction may be performed by the entropy decoder 510 and the intra predictor 542 in the video decoding apparatus. For convenience of description, the video encoding apparatus is referred to, when necessary. Nevertheless, at least some of the embodiments to be described below can be equally or similarly applied to the video encoding apparatus. The video encoding apparatus determines information related to subblock partition in terms of optimizing rate distortion. Thereafter, the video encoding apparatus may encode the information related to subblock partition to generate a bitstream, and may signal the bitstream to the video decoding apparatus.

Hereinafter, the term "coding order" used in the video encoding apparatus is referred to as a decoding order in the video decoding apparatus.

II. Adaptive Determination of Encoding/Decoding Order of Subblocks

<Example 1> A Method for Adaptively Determining a Decoding Order of the Subblocks Using Subblock Information In the present example, the decoding order is adaptively determined according to characteristics of sub-split blocks and is used for intra prediction. The present example allows coding efficiency to be increased or restored picture quality to be improved by using the reference samples in the closest distance by each subblock.

In the present example, the video decoding apparatus does not explicitly signal the decoding order to the video decoding apparatus, and the video decoding apparatus infers the order by itself by referring to subblock information. On the basis of the present example, advantages provided by the ISP technology can be fully utilized while disadvantages of the existing technology can be overcome, and decoding order information does not need to be transmitted to the video decoding apparatus.

Figure 8A:
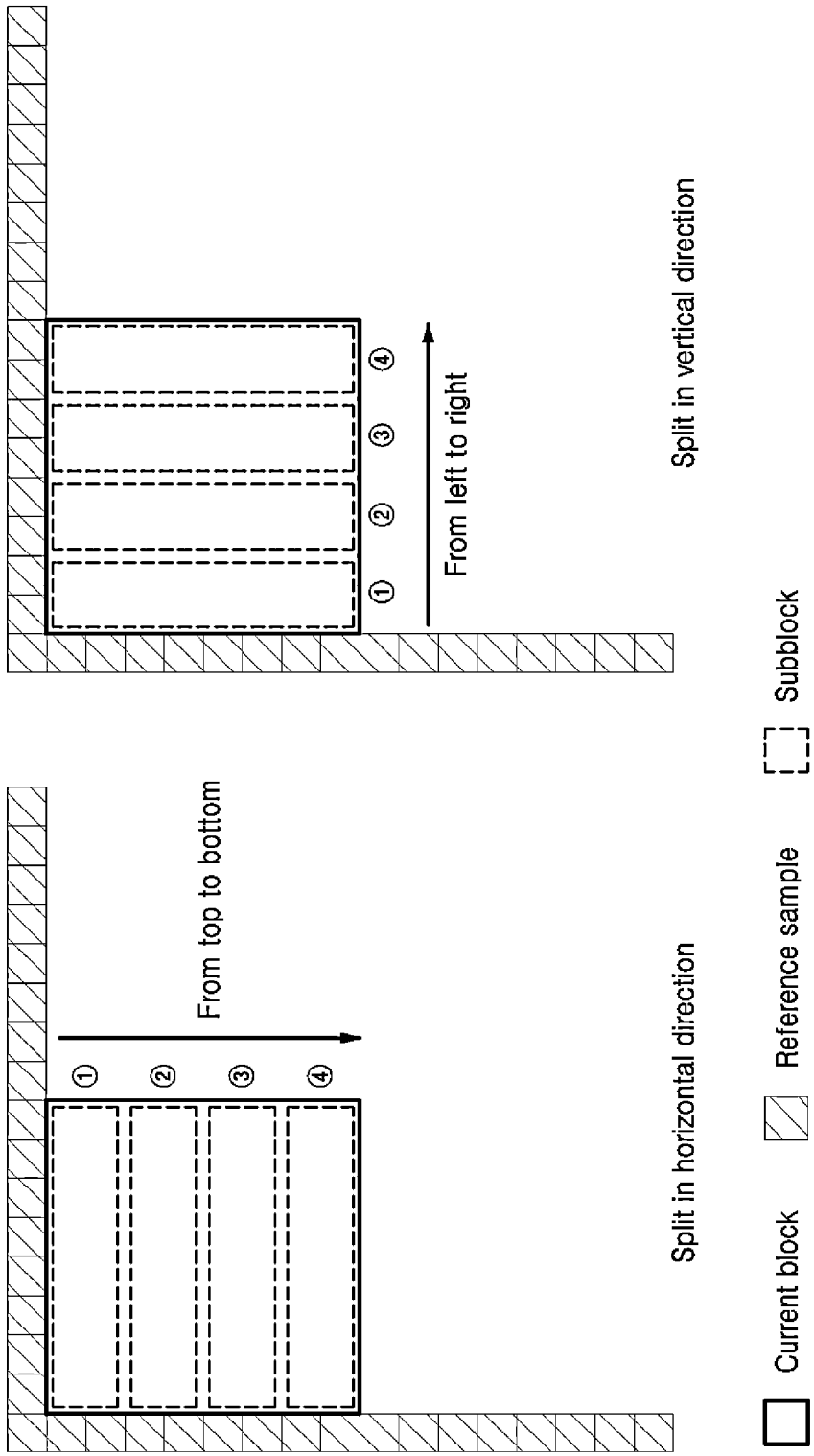
FIGS. 8A-8D are illustrative diagrams illustrating a default order and a reverse order as a decoding order of the subblocks according to an embodiment of the present disclosure.
Figure 8B:
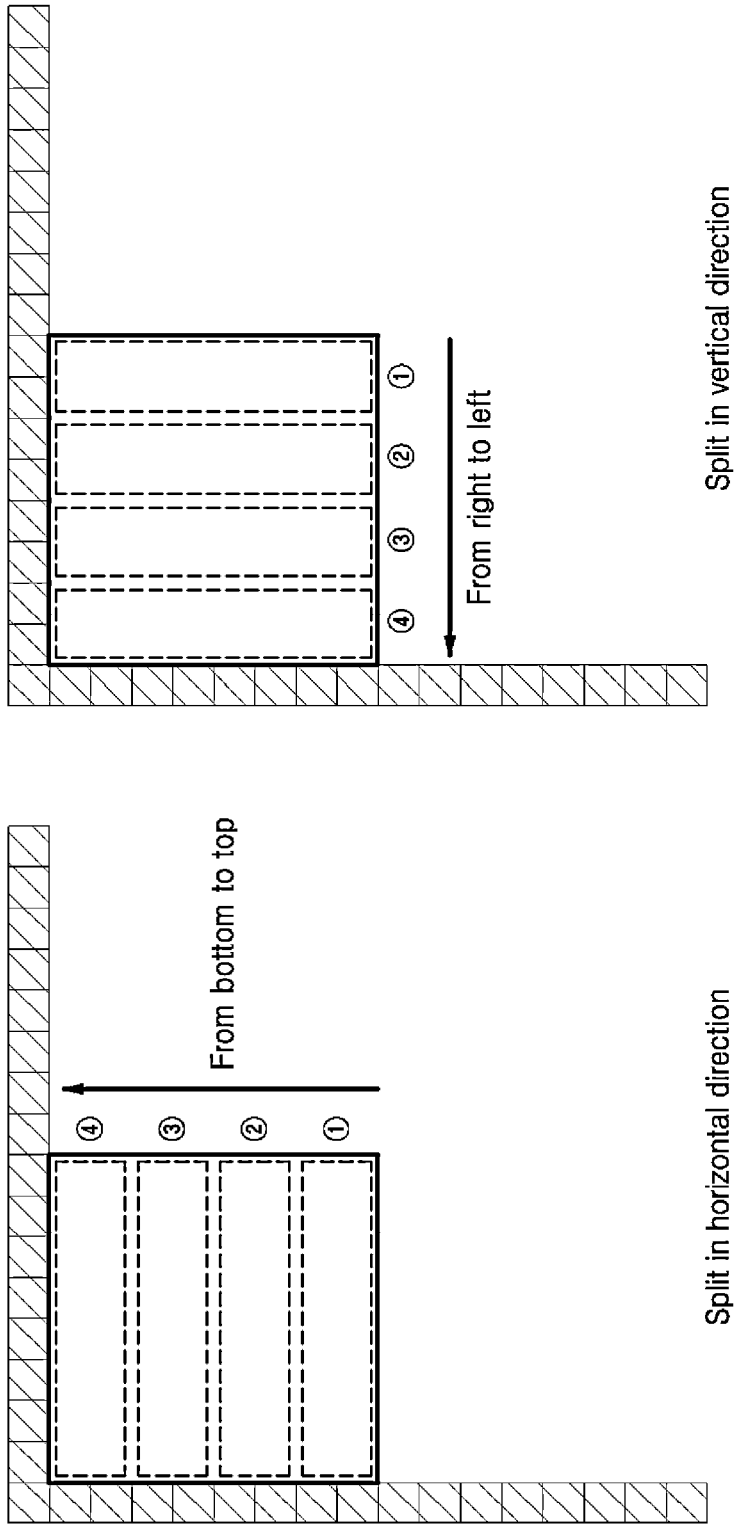
Figure 8C:
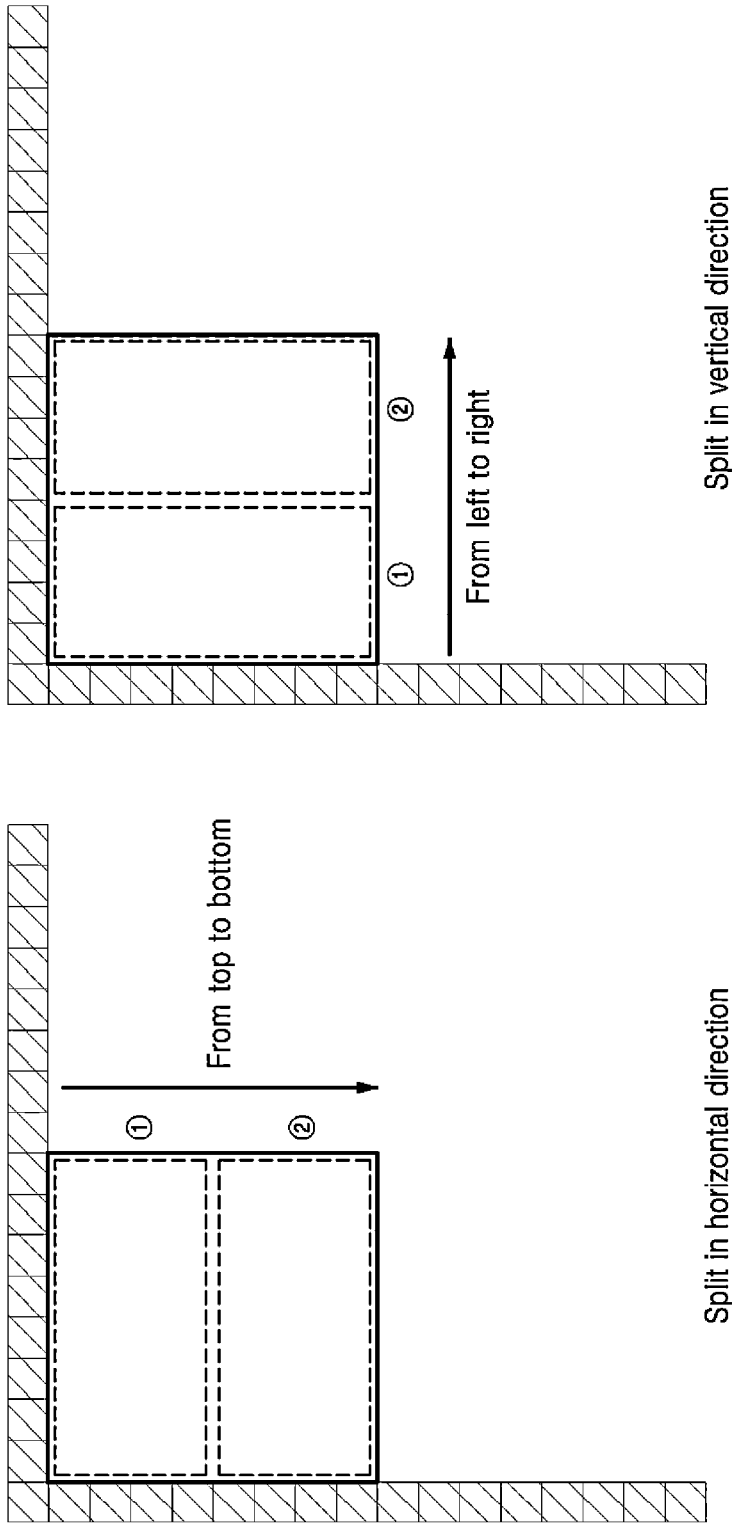
Figure 8D:
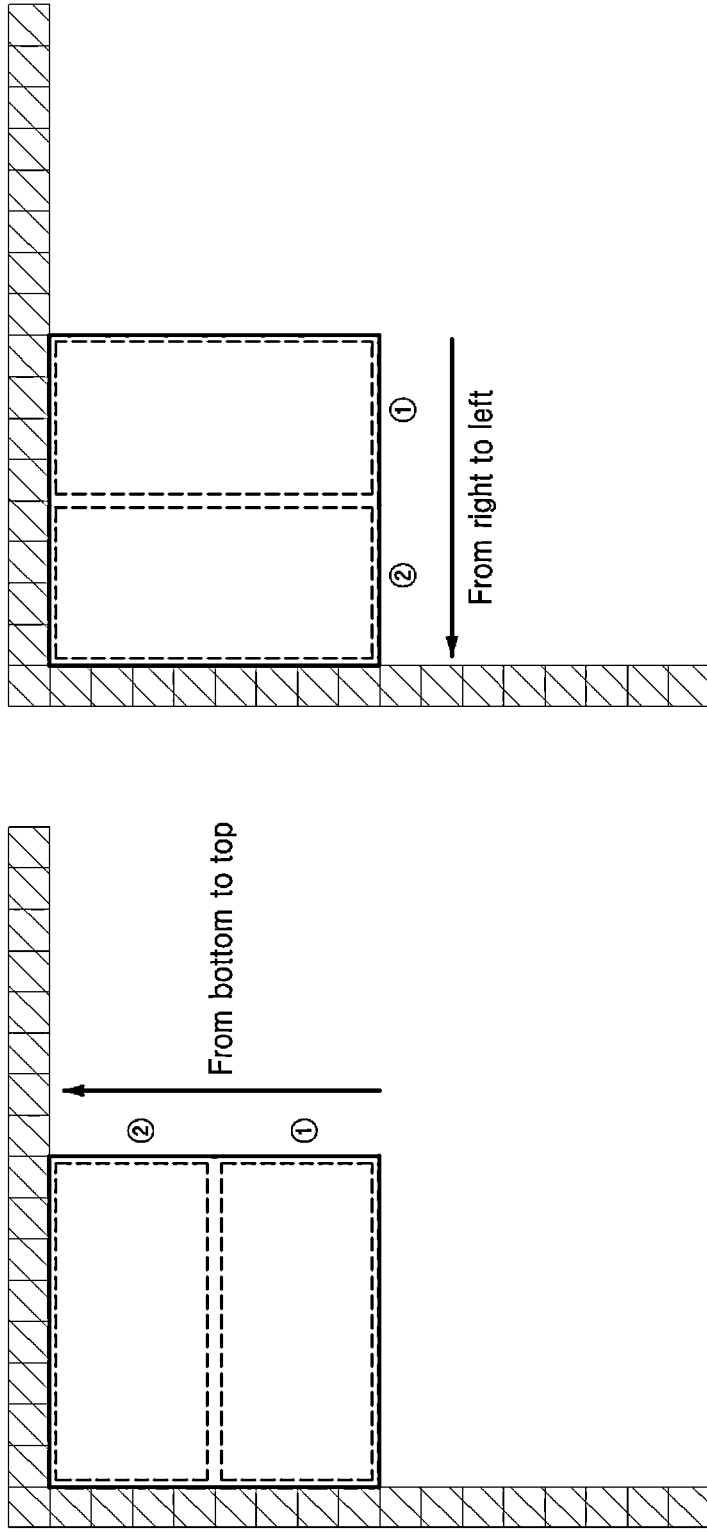

In the following description, for convenience of description related to the decoding order of the subblocks, a direction from left to right or from top to bottom in the decoding order is the default order, as in the examples of FIGS. 8A and 8C. In addition, as in the examples of FIGS. 8B and 8D, a direction from right to left or from bottom to top is a reverse order.

Further, information indicating the subblock decoding order is referred to as an order determination flag isp_order_flag. In this case, when the value of isp_order_flag is 0, subblocks are decoded in the default order, and when the value of isp_order_flag is 1, the subblocks are decoded in the reverse order. In the case of an existing ISP technology, because the subblocks are always decoded in the default order, it can be understood that the value of isp_order_flag is always 0. On the other hand, in an embodiment of the present disclosure, the value of isp_order_flag can be set to 0 or 1 because the default order or the reverse order can be used for intra prediction while being adaptively determined according to the characteristics of the sub-split block.

Figure 9A:
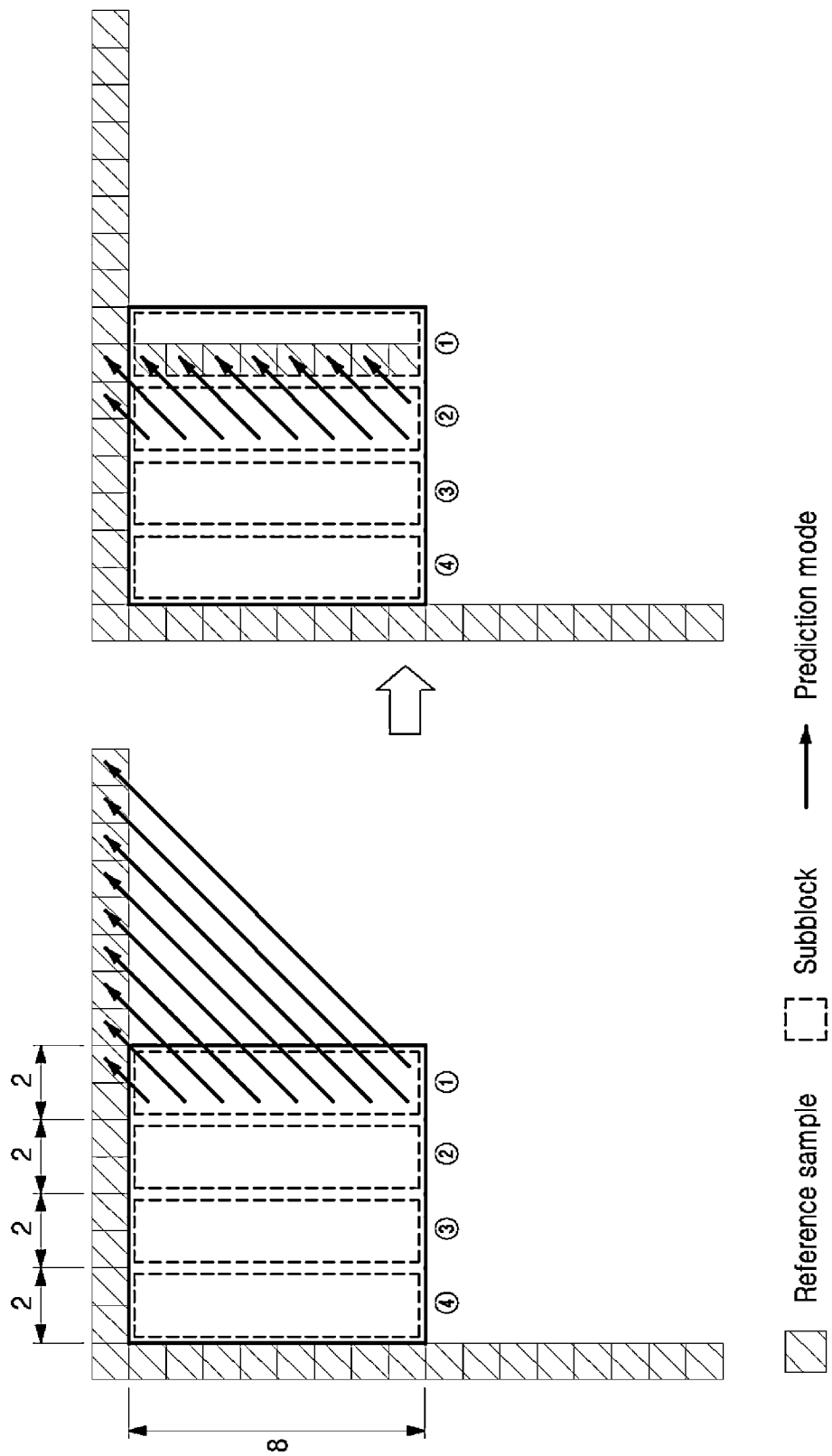
FIGS. 9A and 9B are illustrative diagrams illustrating decoding of the subblocks using the reverse order according to an embodiment of the present disclosure.
Figure 9B:
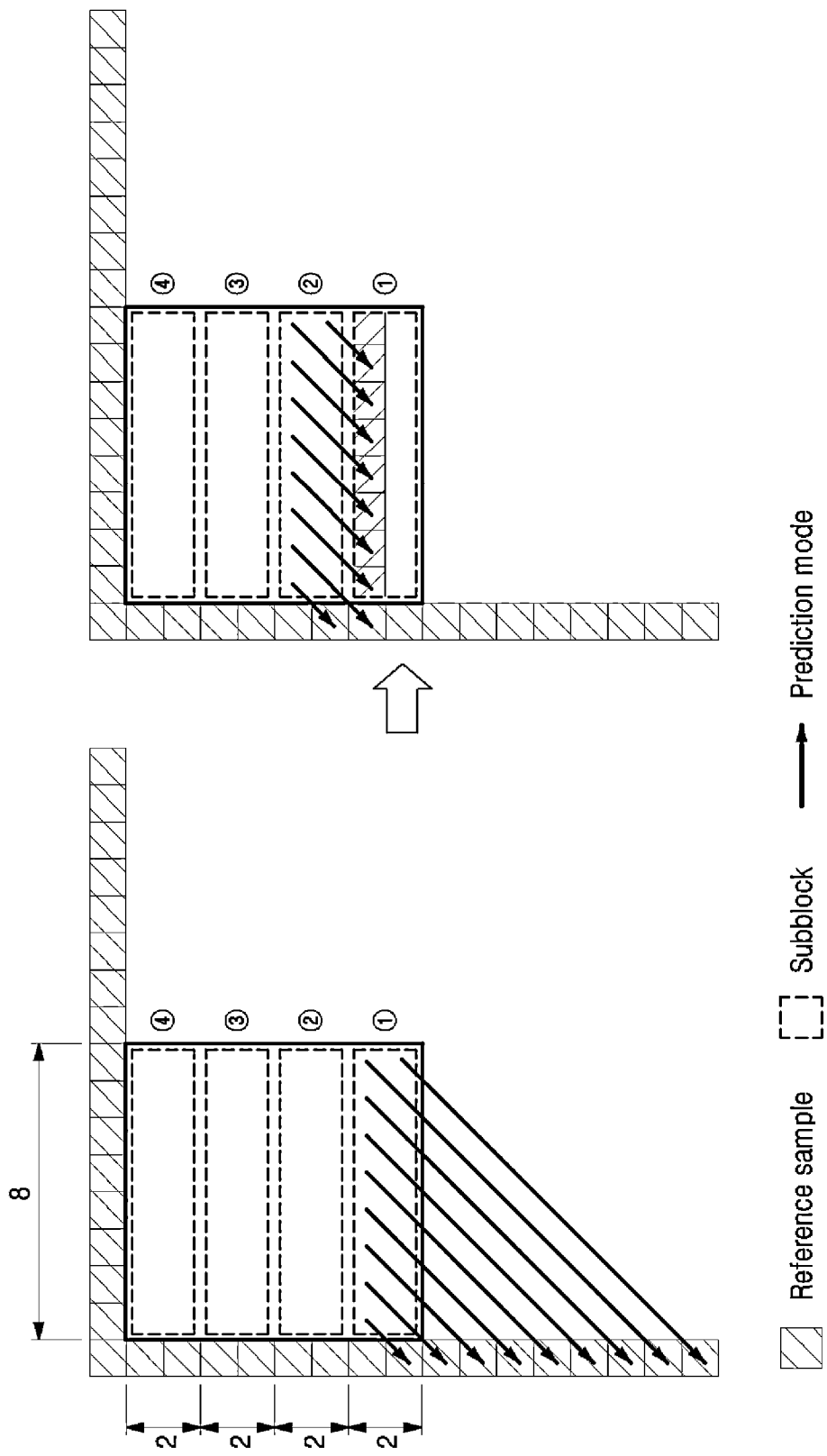

Further, the video decoding apparatus may decode the subblocks according to the determined decoding order. In this case, when decoding is performed in the reverse order rather than the default order, as in the example of FIG. 9A, the video decoding apparatus may use top and right reference samples instead of using the left reference samples for the case of the subblocks quartered in the vertical direction. In addition, as in the example of FIG. 9B, the video decoding apparatus may use bottom and left reference samples instead of using top reference samples for the case of the subblocks quartered in the horizontal direction. In the case of the subblocks bisected in the vertical or horizontal direction, the video decoding apparatus may use reference samples similarly to the quartered subblocks. Because the number of reference samples increases according to the use of the reverse order, coding efficiency can be improved.

It should be considered whether decoding the subblocks in what order can use reference samples at a closer distance in order to determine which of the default order and the reverse order is desirable, i.e., to determine the value of isp_order_flag.

In an embodiment of the present disclosure, the video encoding apparatus does not explicitly signal the value of isp_order_flag to the video decoding apparatus. The video decoding apparatus infers the value of isp_order_flag by itself by referring to at least one or a plurality of data of the shape of the subblock, the size of the subblock, the sub-splitting direction, the prediction mode, the number of newly restored reference samples, and a ratio of newly restored reference samples.

Hereinafter, the determination of the decoding order of the subblocks is based on an order determiner isReverseOrder( ) function.

Figure 10:
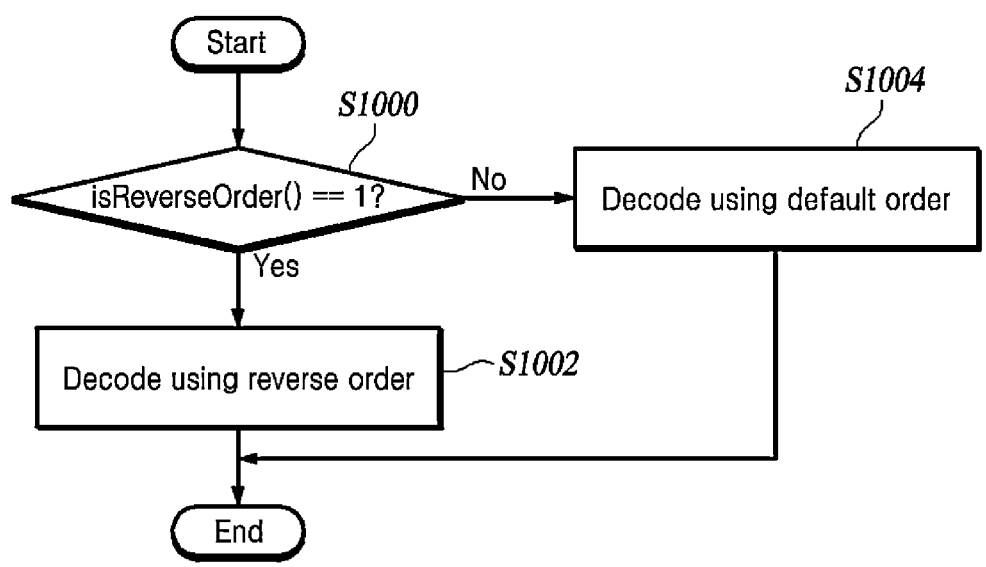
FIG. 10 is a flowchart illustrating a method of decoding subblocks using an order determiner according to an embodiment of the present disclosure.

FIG. 10 is a flowchart illustrating a method of decoding subblocks using an order determiner, according to an embodiment of the present disclosure.

In an operation S1000, the video decoding apparatus checks a value of the order determiner to determine the decoding order.

In an operation S1002, the video decoding apparatus selects the reverse order when the output value of the order determiner is 1 (i.e., Yes in S1000). In an operation S1004, the video decoding apparatus selects the default order when the output value of the order determiner is 0 (i.e., No in S1000).

In an operation of the order determiner isReverseOrder( ) function, the direction of the sub-splitting may be required. This direction is determined according to the subblock partition direction flag intra_subpartitions_split_flag, as described above according to Table 1. In other words, when the subblock partition direction flag is false, the current block is sub-split in the horizontal direction, and when the subblock partition direction flag is true, the current block is sub-split in the vertical direction. Further, the prediction direction of the current block including subblocks is determined according to the intra prediction mode predModeIntra.

In the following description, the intra prediction mode is defined as follows, according to the example of FIG. 3a. In this example, numbers 2 to 17 are defined as bottom-left prediction modes, number 18 is defined as a leftward prediction mode, numbers 19 to 49 are defined as top-left prediction modes, number 50 is defined as an upward prediction mode, and numbers 51 to 66 are defined as top-right prediction modes.

To determine the value of isp_order_flag, data of the subblock may be provided as an input to the order determiner. In order to determine the value of isp_order_flag, embodiments of the present disclosure can be implemented in various ways according to data of a subblock referred to by the order determiner, i.e., an input provided to the order determiner. Hereinafter, specific realization examples of Example 1 are described.

The video decoding apparatus may parse the data of the subblocks from a bitstream or calculate these using other previously decoded data. The video encoding apparatus may set the data of the subblock in an upper stage to optimize bit rate distortion. Accordingly, a lower stage of the video encoding apparatus may acquire such data of the subblock from the upper stage or calculate the data using other data acquired in advance. Further, the video encoding apparatus may encode the data of the subblock to generate a bitstream and then transmit the bitstream to the video decoding apparatus.

<Example 1-1> when the Data of the Subblock is the Intra Prediction Mode and the Partition Direction In the present example, in order to determine the value of isp_order_flag, the video decoding apparatus refers to the intra prediction mode and the subblock partition direction flag. The intra prediction mode and the subblock partition direction flag are provided as inputs to the order determiner.

For example, when the partition in the vertical direction is used and the prediction mode is the top-right prediction mode (i.e., a prediction mode greater than number 50), the video decoding apparatus may determine the decoding order in the reverse order (i.e., isp_order_flag=1). Further, when the partition in the horizontal direction is used and the prediction mode is the bottom-left prediction mode (i.e., a prediction mode lower than number 18), the video decoding apparatus may determine the decoding order in the reverse order (i.e., isp_order_flag=1). In other cases, the default order may be determined (i.e., isp_order_flag=0).

In the above description, in order to implement a case in which the prediction mode is a further top-right prediction mode or a case in which the prediction mode is a further bottom-left prediction mode, the offset modeOffset value of the prediction mode may be set in advance. As an example, a direction further inclined to the right by the modeOffset value may be set to a further top-right direction with reference to predModeIntra=50 indicating an upward direction. For example, when modeOffset=0, the prediction mode greater than number 50 may be determined to be the further top-right prediction mode, and when modeOffset=3, the prediction mode greater than number 53 may be determined to be the further top-right prediction mode. Similarly, in the case of the bottom-left direction, a prediction mode with a value smaller than the modeOffset value with reference to predModeIntra=18 accurately indicating a leftward direction without up-and-down biasing may be set to be the further bottom-left prediction mode. For example, assuming a case of modeOffset=3, since a value of (18−modeOffset) is 15, a prediction mode smaller than number 15 may be determined to be the further bottom-left prediction mode.

The modeOffset value may be set in advance, such as, . . . , −3, −2, −1, 0, 1, 2, 3, . . . . In another embodiment, a separate modeOffset value may be set in each case in which the prediction modes are determined to be the further top-right prediction mode and the further bottom-left prediction mode. Hereinafter, for convenience, an operation of an isReverseOrder( ) function of the order determiner may be described with modeOffset set to 0.

For Example 1-1, an operation of the isReverseOrder (intra_subpartitions_split_flag, predModeIntra) function is as follows.

---

When the following conditions are all true, 1 is output.
(Condition 1) intra_subpartitions_split_flag == 0 //
partition in horizontal direction
(Condition 2) 2 ≤ predModeIntra < 18 − modeOffset
Alternatively, when the following conditions are all true, 1 is output.
(Condition 3) intra_subpartitions_split_flag == 1 //
partition in vertical direction
(Condition 4) predModeIntra > 50 + modeOffset
Otherwise, 0 is output.

---

In this example, (condition 1) indicates the partition in the horizontal direction, and (condition 2) indicates that the prediction mode is included in the bottom-left prediction modes in which the modeOffset is considered. Further, (condition 3) indicates the partition in the vertical direction, and (condition 4) indicates that the prediction mode is included in the top-right prediction modes in which modeOffset is considered.

Figure 11A:
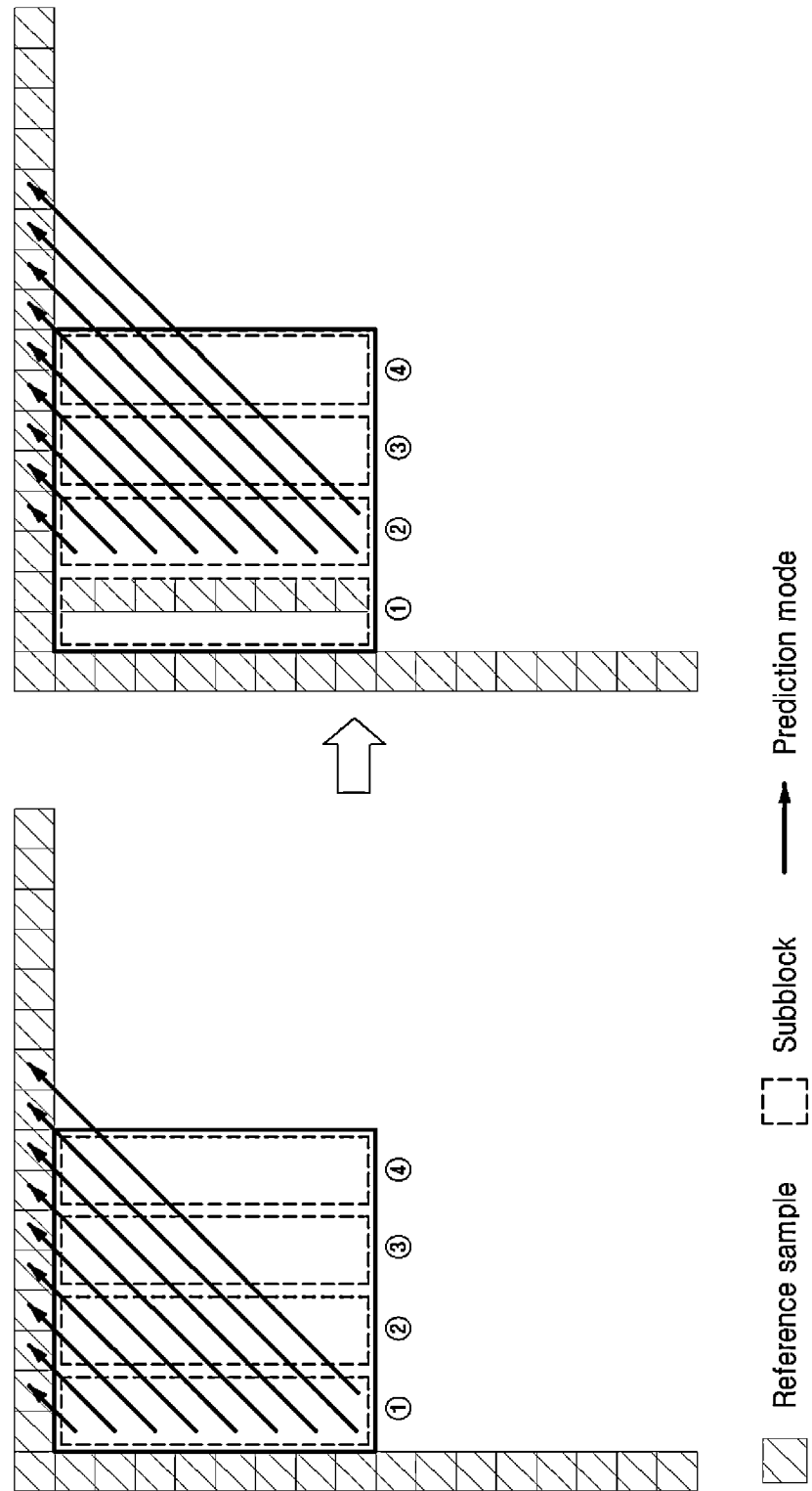
FIGS. 11A and 11B are illustrative diagrams illustrating decoding of the subblocks according to an embodiment of the present disclosure.
Figure 11B:
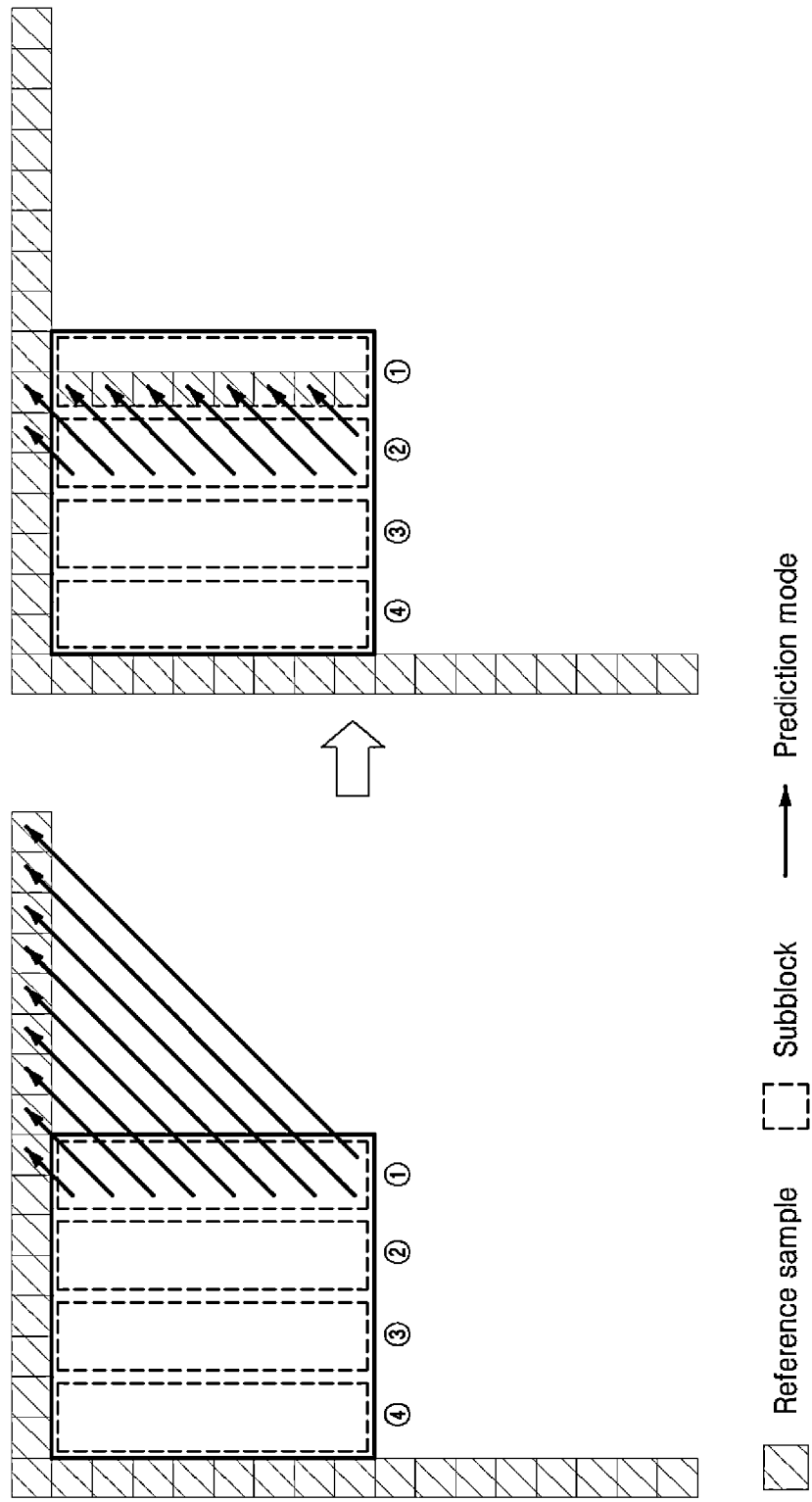

FIGS. 11A and 11B are illustrative diagrams illustrating decoding of the subblocks, according to an embodiment of the present disclosure.

For example, it is assumed that the partition in the vertical direction is set and the intra prediction mode is number 66. According to the present example, when intra_subpartitions_split_flag=1 and predModeIntra is number 66, (condition 3) and (condition 4) are satisfied, and thus, the order determiner determines isp_order_flag to be 1. Examples of FIGS. 11A and 11B may be referred to in order to understand that this setting may be desired in terms of coding efficiency. Compared to the example of FIG. 11A, when isp_order_flag=1, each subblock may use the restored pixels within the previously decoded subblock as reference samples as in the example of FIG. 11B.

In other words, according to the present example, the video decoding apparatus may determine isp_order_flag=1 without a separate signal from the video encoding apparatus so that each subblock can use restored pixels in a previous subblock as reference samples, as in the example of FIG. 11B. Similarly, the video encoding apparatus may also determine isp_order_flag=1 to perform encoding according to the above-described process.

<Example 1-2> Data of Subblock Includes the Number of Newly Restored Reference Samples When reference samples on both the left side and the top of an adjacent block are used at the time of intra prediction (i.e., when the prediction mode is a top-left prediction mode and is greater than number 18 and less than number 50 in FIG. 3A), one-dimensional reference samples are made and then, intra prediction is performed.

Figure 12A:
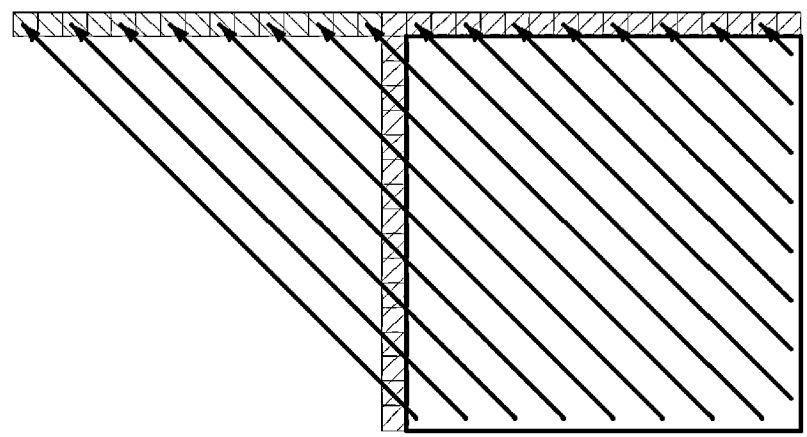
FIGS. 12A and 12B are illustrative diagrams illustrating rearranged reference samples.
Figure 12A:
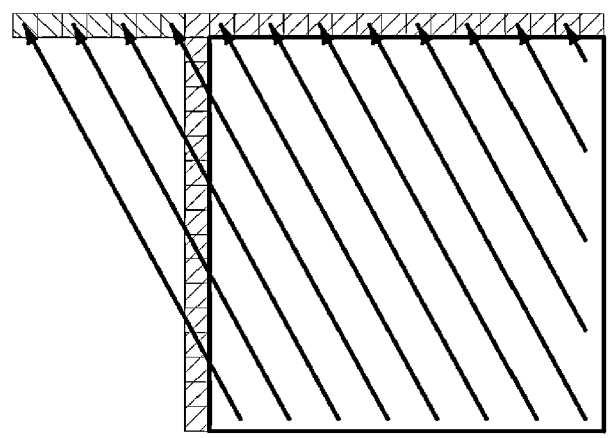
Figure 12A:
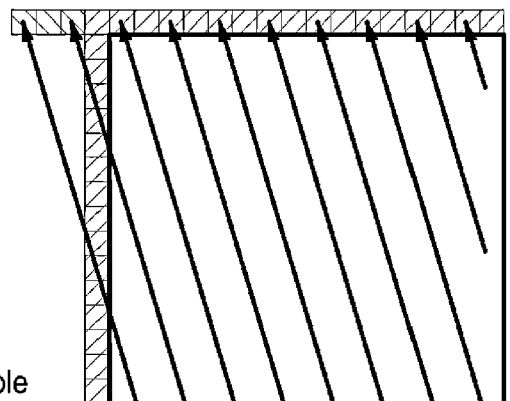
Figure 12B:
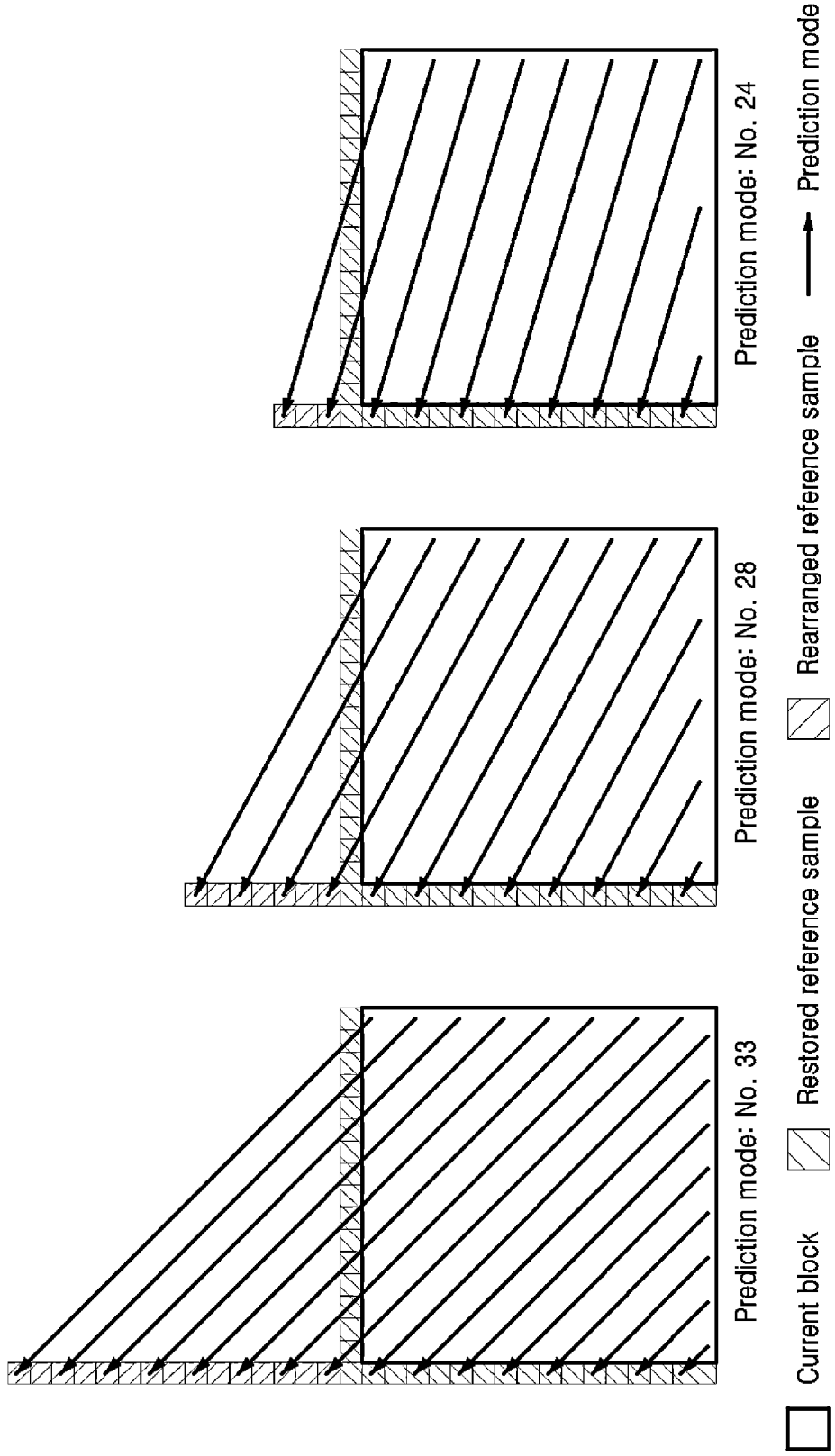

FIGS. 12A and 12B are illustrative diagrams illustrating rearranged reference samples.

For example, as in the example of FIG. 12A, when the prediction mode is greater than or equal to number 34 and less than number 50, some of the left reference samples may be added to the left of the reference samples on the top. Further, as in the example of FIG. 12B, when the prediction mode is greater than number 18 and less than number 34, some of the reference samples on the top may be added to the top of the left reference samples.

In the following description, these added reference samples are referred to as 'rearranged reference samples'. The number of rearranged reference samples depends on the prediction mode, width (W), and height (H) of the current block. For example, as in the example of FIG. 12A, when the height of the current block is 16 and the prediction mode is number 34, the number of rearranged reference samples is 15, when the prediction mode is number 40, the number of rearranged reference samples is 7, and when the prediction mode is number 44, the number of rearranged reference samples is 3. Further, as in the example of FIG. 12B, when the width of the current block is 16 and the prediction mode is number 33, the number of rearranged reference samples is 14, when the prediction mode is number 28, the number of rearranged reference samples is 7, and when the prediction mode is number 24, the number of rearranged reference samples is 3.

In various embodiments, when a larger number of rearranged reference samples are used, an amount of use of more closely reference samples increases, and thus, coding efficiency can be improved.

In Example 1-2, in order to determine the value of isp_order_flag, the video decoding apparatus refers to the intra prediction mode, the subblock partition direction flag, and sizes (W and H) of the current block. The intra prediction mode, the subblock partition direction flag, and the sizes (W and H) of the current block are provided as inputs to the order determiner. As described above, the number of rearranged reference samples may be determined based on the size of the current block and the prediction mode.

For Example 1-2, an operation of an isReverseOrder (intra_subpartitions_split_flag, predModeIntra, Width, Height) function is as follows:

---

When the following conditions are all true, 1 is output.
(Condition 1) intra_subpartitions_split_flag == 0 //
partition in horizontal direction
(Condition 2) 2 ≤ predModeIntra < 18 − modeOffset
(Condition 3) numNew >= numNew_THD -continued

```
Alternatively, when the following conditions are all true, 1 is output.
(Condition 4) intra_subpartitions_split_flag == 1 //
partition in vertical direction
(Condition 5) predModeIntra > 50 + modeOffset
(Condition 6) numNew >= numNew_THD
Otherwise, 0 is output.
```

Figure 13:
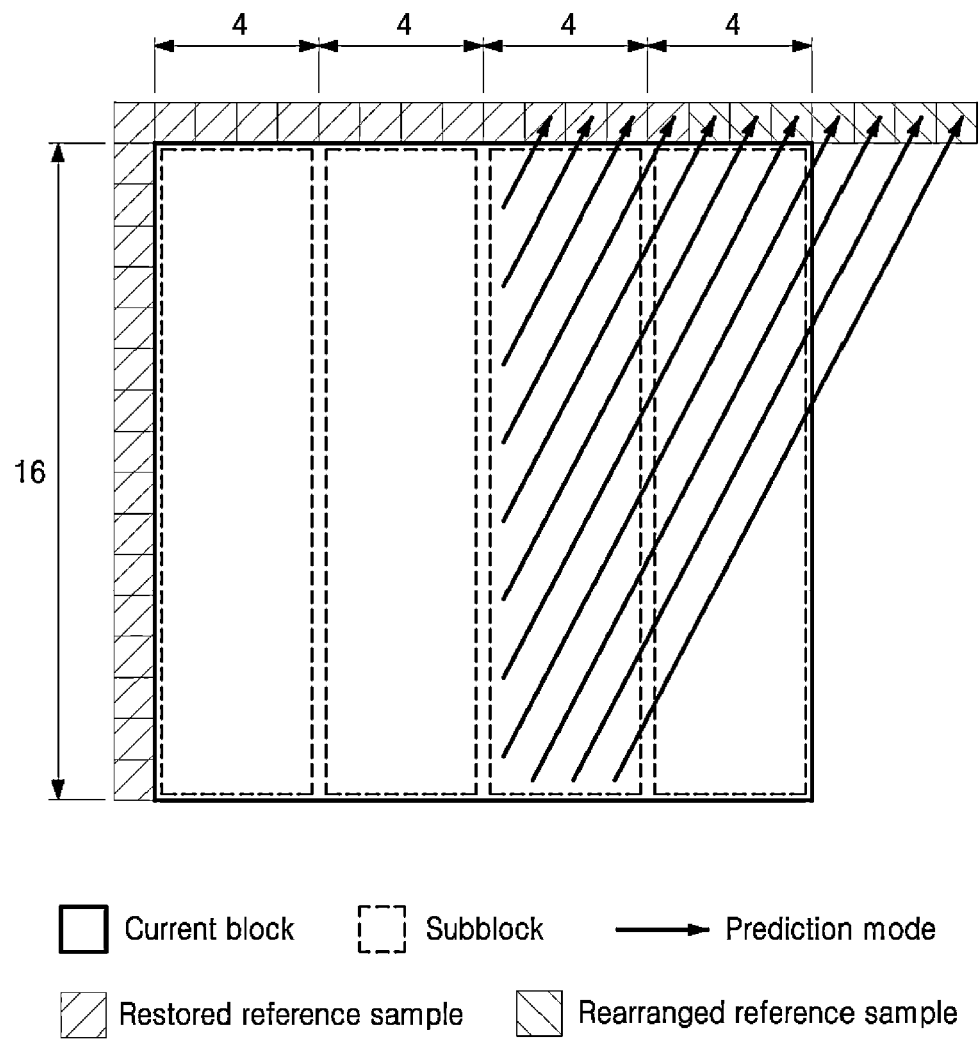
FIG. 13 is an illustrative diagram illustrating rearranged reference samples according to an embodiment of the present disclosure.

In this example, numNew means the number of rearranged reference samples in each subblock when the decoding order is changed, and may be calculated as in the examples of FIGS. 12A, 12B, and 13. numNew_THD is a preset threshold value and may be set as 1, 2, 3, 4, . . . . Further, modeOffset has the same role as in Example 1-1.

In the present example, the rearranged reference samples are some of the reference samples on the right side of each subblock, as illustrated in FIG. 13 when the prediction mode is the top-right prediction mode in which modeOffset is considered, and may be added to the right of the reference sample on the top of each subblock. In addition, when the prediction mode is the bottom-left prediction mode in which modeOffset is considered, the rearranged reference samples are some of the reference samples on the bottom of each subblock and may be added to the bottom of reference samples on the right side of each subblock.

For example, it is assumed that intra_subpartitions_split_flag=1, predModeIntra=Width=16, Height=16, and the value of numNew_THD is set to 4. In this case, the value of numNew is derived as 7 as in the example of FIG. 13. Therefore, according to the present example, the output value of the order determiner is determined to be 1, i.e., the value of isp_order_flag is determined to be 1. Thereafter, the video decoding apparatus may decode the subblocks using the reverse order. Similarly, the video encoding apparatus may also determine isp_order_flag=1 to perform encoding according to the above-described process.

<Example 1-3> Data of Subblock Includes Ratio of Newly Rearranged Reference Samples In the present example, rearranged reference samples are considered as in the Example 1-2, but a ratio of the rearranged reference samples to the number of pre-stored reference samples rather than an absolute number of the rearranged reference samples is considered. When a ratio of the rearranged reference samples is higher than or equal to a preset threshold value newRatio_THD, the reverse order may be determined as the decoding order of the subblocks. In this case, newRatio_THD may be, for example, { . . . , 1/64, 2/64, 3/64, . . . , 1, 2, 3, 4, 5, 6, 7, 8, . . . }.

In Example 1-3, in order to determine the value of isp_order_flag, the video decoding apparatus refers to the intra prediction mode, the subblock partition direction flag, the size (W and H) of the current block, and the size (i.e., subW and subH) of the subblock. As described above, the number of rearranged reference samples may be determined based on the size of the current block and the prediction mode. Further, in the present example, information on subW and subH is explicitly provided as the input to the order determiner, but how the current block is sub-split can be determined based on the size of the current block and a subblock partition direction according to the ISP technology. Therefore, as another embodiment, the information on subW and subH may not be explicitly provided as the input to the order determiner. For Example 1-3, an operation of an isReverseOrder(intra_subpartitions_split_flag, predModeIntra, Width, Height, subW, subH) function implementing the present example is as follows.

```
When the following conditions are all true, 1 is output.
(Condition 1) intra_subpartitions_split_flag == 0 //
partition in horizontal direction
(Condition 2) 2 <= predModeIntra < 18 - modeOffset
(Condition 3) newRatio >= newRatio_THD
Alternatively, when the following conditions are all true, 1 is output.
(Condition 4) intra_subpartitions_split_flag == 1 //
partition in vertical direction
(Condition 5) predModeIntra > 50 + modeOffset
(Condition 6) newRatio >= newRatio_THD
Otherwise, 0 is output.
```

In this example, newRatio representing a ratio of newly rearranged reference samples can be obtained as follows.

```
When intra_subpartitions_split_flag == 0
newRatio = newNum / subH
Alternatively, //i.e., when intra_subpartitions_split_flag == 1
newRatio = newNum / subH
```

As an example, a case in which the current block with a width of 16 and a height of 16 is vertically split, a width of the subblock is 4 and a height is 16, the intra prediction mode is number 60, and numNew is 7 accordingly as in the example of FIG. 13 is assumed. newRatio calculated according to the above method is 7/4=1.75. In this case, when a value of newRatio_THD is preset to 1, the output value of the order determiner is determined to be 1, i.e., the value of isp_order_flag is determined to be 1 according to the present example. Thereafter, the video decoding apparatus may decode the subblocks using the reverse order. Similarly, the video encoding apparatus may also determine isp_order_flag=1 to perform encoding according to the above-described process.

<Example 2> Method of Selectively Signaling a Decoding Order

It may not always be apparent that performing decoding in the reverse order will result in better coding efficiency than decoding in the default order. A case in which it is apparent that using the reverse order or the default order is advantageous in terms of coding efficiency is referred to as situation 1, and a case in which it is not apparent to use either the reverse order or the default order is referred to as situation 2.

According to the present example, the video encoding apparatus does not signal isp_order_flag in the case of situation 1. This is because the video decoding apparatus can recognize more advantageous one of the reverse order and the default order. In this case, the video decoding apparatus infers the isp_order_flag value by itself using the methods described above in Example 1 and decodes the subblocks according to the value. On the other hand, in the case of situation 2, because more advantageous one of the reverse order and the default order is not always apparent, the video encoding apparatus may determine an order advantageous in terms of optimizing rate distortion. isp_order_flag=0 set when the default order is advantageous and isp_order_flag=1 set when the reverse order is advantageous. The video encoding apparatus may then signal the isp_order_flag value to the video decoding apparatus. Accordingly, in case of situation 2, the video decoding apparatus may parse the isp_order_flag value from the bitstream and then decode the subblocks using the value.

In the present example, it is important to discriminate whether the current block corresponds to situation 1 or situation 2. For example, situation 1 and situation 2 may be discriminated based on at least one of channel information, a chroma format, a coding type, the intra prediction mode, the sub-splitting direction, a position of the current block, and a block size.

In an embodiment, the video encoding apparatus may refer to the channel information. For example, when the currently encoded channel is a luma (Y) channel, situation 2 is determined, and when the currently encoded channel is a chroma (Cb/Cr) channel, situation 1 can be determined. As another example, the reverse may also be possible.

In another embodiment, the video encoding apparatus may refer to the coding type. For example, when the coding type of the currently encoded slice (or block) is intra (i.e., intra slice), situation 2 may be determined, and when the coding type of the slice (or block) is inter (i.e., inter slice), situation 1 may be determined. As another example, the reverse is also possible.

In yet another embodiment, the video encoding apparatus may refer to the chroma format. For example, when the chroma format of the current block is 4:4:4, situation 2 may be determined, and otherwise, situation 1 may be determined. In another example, situation 2 may be determined when the chroma format of the current block is 4:4:4 or 4:2:2, and otherwise, situation 1 may be determined. As another example, the reverse is also possible. The chroma format is a value indicating relative resolution of the chroma channel compared to the luma channel, and may be usually indicated in the bitstream using sps_chroma_format_idc. The chroma format according to sps_chroma_format_idc may be defined as shown in Table 2.

TABLE 2

| chroma_format_idc | Chroma format |
| --- | --- |
| 0 | Monochrome |
| 1 | 4:2:0 |
| 2 | 4:2:2 |
| 3 | 4:4:4 |

In still another embodiment, the video encoding apparatus may refer to the intra prediction mode. For example, when the directions indicated by the intra prediction mode are the top-right direction and the bottom-left direction, situation 1 may be determined, and the direction indicated by the intra prediction mode is a direction slightly deviating from the exact upward direction or a direction slightly deviating from the exact leftward direction, situation 2 may be determined. As another example, the reverse is also possible.

In another embodiment, the video encoding apparatus may refer to the intra prediction mode and the subblock partition direction flag together, as shown in Table 3.

TABLE 3

| Range of intra prediction mode X | intra subpartitions split flag | Situation 1/ Situation 2 |
| --- | --- | --- |
| 2 ≤ X < 18 − modeOffset | 0 (horizontal spilt) | Situation 1 |
| | 1 (vertical split) | |
| 18 − modeOffset ≤ X ≤ 18 + modeOffset | 0 (horizontal spilt) | Situation 2 |
| | 1 (vertical split) | Situation 1 |
| 18 + modeOffset < X < 50 − modeOffset | 0 (horizontal spilt) | |
| | 1 (vertical split) | |

TABLE 3-continued

| Range of intra prediction mode X | intra subpartitions split flag | Situation 1/ Situation 2 |
| --- | --- | --- |
| 50 − modeOffset ≤ X ≤ 50 + modeOffset | 0 (horizontal spilt) | |
| | 1 (vertical split) | Situation 2 |
| 50 + modeOffset < X ≤ 66 | 0 (horizontal spilt) | Situation 1 |
| | 1 (vertical split) | |

In an example, when the directions indicated by the intra prediction mode are top-right, bottom-left, and top-left direction, situation 1 may be determined, and when the direction indicated by the intra prediction mode is a direction slightly deviating from an exact upward or exact downward direction, situation 1 or situation 2 may be determined with further reference to the sub-splitting direction. As another example, the reverse is also possible.

In another embodiment, the video encoding apparatus may refer to the position of the current block. For example, when the current block is located at a boundary of a picture, CTU, tile, or slice, situation 1 may be determined and otherwise, situation 2 may be determined. As another example, the reverse is also possible. When the current block exists on the boundary of the picture, CTU, tile, or slice, the presence or absence of reference pixels to be used for prediction may be determined in advance depending on which side of the boundary the current block is located. Therefore, an advantageous one of the default order and the reverse order may be determined. Therefore, in this case, situation 1 may be determined.

<Example 3> Method of Signaling Decoding Order

In the present example, the video decoding apparatus determines the decoding order using the parsed isp_order_flag without inferring the decoding order of the subblocks. In other words, the video encoding apparatus always transmits isp_order_flag to the video decoding apparatus, and the video decoding apparatus may determine the decoding order of the subblocks using the transmitted isp_order_flag.

<Example 4> Method for Signaling One of Methods of Examples 1, 2, and 3

In the present example, one of the methods of Examples 1 to 3 may be indicated by using a signal at a high level than a CU, such as a slice or a picture, for example, information of sps_isp_order_signaling_idx in order to determine the decoding order of the subblocks. The decoding order of the subblocks according to sps_isp_order_signaling_idx may be determined as shown in Table 4.

TABLE 4

| sps_isp_order_signaling_idx | ISP coding order |
| --- | --- |
| 0 | Implicit fixed ISP coding order by Default order |
| 1 | Implicit ISP coding order (Example 1) |
| 2 | Selective explicit ISP coding order (Example 2) |
| 3 | Explicit ISP coding order (Example 3) |

According to Table 4, when sps_isp_order_signaling_idx=0, subblocks are always decoded using the default order. When sps_isp_order_signaling_idx=1, Example 1 is used. In other words, isp_order_flag is not signaled from the video encoding apparatus to the video decoding apparatus. When sps_isp_order_signaling_idx=2, isp_order_flag is not signaled in situation 1, and isp_order_flag is signaled from the video encoding apparatus to the video decoding apparatus in situation 2. When sps_isp_order_signaling_idx=3, isp_order_flag is always signaled from the video encoding apparatus to the video decoding apparatus.

<Example 5> Method of Determining Whether Examples 1, 2, and 3 are Applicable in Advance When the subblocks are decoded in the reverse order, the improvement in coding efficiency may be insignificant, or when a reduction in the complexity of the video encoding apparatus or video decoding apparatus is required, it may be desirable not to apply the above-described examples. Therefore, in the present example, whether or not to apply a method of decoding subblocks using the reverse order is determined in advance, as in the example of FIG. 14.

Figure 14:
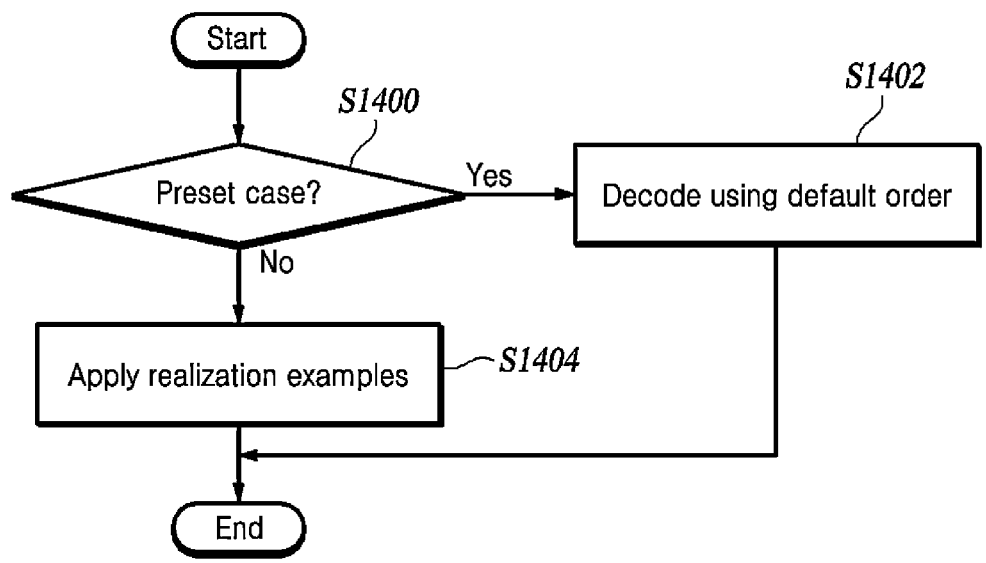
FIG. 14 is a flowchart illustrating a method of decoding subblocks using an order determiner according to another embodiment of the present disclosure.

FIG. 14 is a flowchart illustrating a method of decoding subblocks using an order determiner according to another embodiment of the present disclosure.

In an operation S1400, the video decoding apparatus checks whether a case corresponds to a preset case in order to determine, in advance, whether or not to apply the method of decoding subblocks using the reverse order.

In an operation S1402, when the case corresponds to the preset case (Yes in S1400), the video decoding apparatus always decodes the subblocks in the default order. On the other hand, when the case does not correspond to the preset case (No in S1400), the video decoding apparatus may apply the above-described realization examples in an operation S1404. When a determination is made whether the case is the preset case, at least one of the position of the current block, the chroma format, the channel information, and coding form (picture, slice, tile, or CU coding form) may be considered.

For example, for the position of the current block, reference samples do not exist in a case in which the current block is at a boundary of a picture. Therefore, the case in which the current block is at the boundary of the picture may be determined to be the preset case, and since it is expected that the improvement in coding efficiency is insignificant when subblocks are encoded using the reverse order, the default order may be determined to be the encoding order.

<Example 6> Method of Performing Weighted Combination on Predictor Generated According to Default Order and Predictor Generated According to Reverse Order In the present example, inefficient aspects in the respective methods can be offset with each other by performing prediction using both the method of Example 1 and an ISP technology of the related art. In the present example, when the decoding order of the subblocks is determined to be the reverse order according to Example 1, decoding is performed by performing weighted combination on the two methods using weights A and B. In other words, when a determination is made that decoding is performed in the reverse order according to Example 1, a final predictor predSamples[x][y] is determined as in Equation 1.

$$\text{predSamples}[x][y] = A \cdot \text{predISP}[x][y] + B \cdot \text{predRevISP}[x][y] \quad \text{Equation 1}$$

In Equation 1, x and y represent a position of a pixel in a picture. predISP[x][y] represents a predictor restored using the default order, and predRevISP[x][y] represents a predictor restored using the reverse order according to Example 1.

Figure 15:
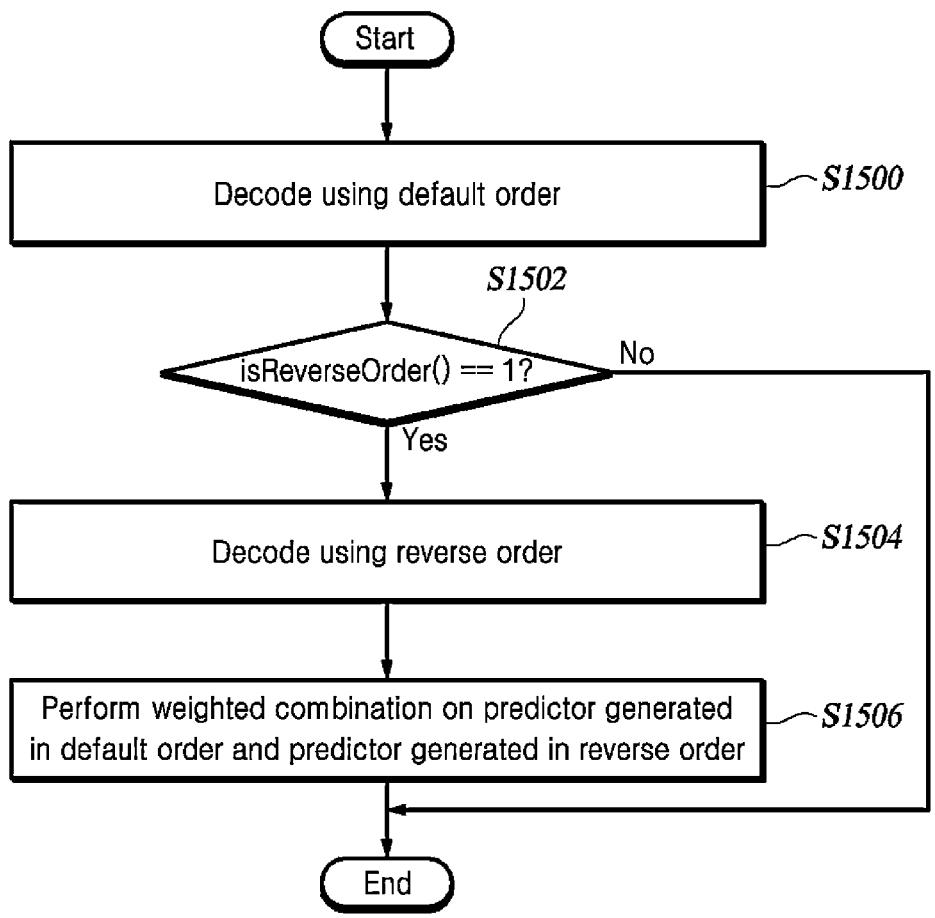
FIG. 15 is a flowchart illustrating a method of decoding subblocks using an order determiner according to another embodiment of the present disclosure.

FIG. 15 is a flowchart illustrating a method of decoding subblocks using an order determiner according to another embodiment of the present disclosure.

In an operation S1500, the video decoding apparatus generates predictors of the subblocks using the default order.

In an operation S1502, the video decoding apparatus checks the value of the order determiner for the subblocks.

When the value of the order determiner is 0 (No in S1502), the process of predicting the subblocks ends.

When the value of the order determiner is 1 (Yes in S1502), the video decoding apparatus generates predictors of the subblocks in the reverse order in an operation S1504.

In an operation S1506, as shown in Equation 1, the video decoding apparatus performs weighted combination on a predictor generated in the default order and a predictor generated in the reverse order.

Various examples for determining the weights A and B, according to some embodiments, are as follows.

<Example 6-1> Method of Using Preset Weights

In the present example, weighted combination is performed as shown in Equation 1 using preset weights to generate a final predictor. In this case, the weights may be determined in advance as shown in Table 5. When one of a plurality of weights is used, the video encoding apparatus may determine an index of the weights and then signal the determined index to the video decoding apparatus.

TABLE 5

| Weight A | Weight B |
|---|---|
| 1/2 | 1/2 |
| 1/4 | 3/4 |
| 3/4 | 1/4 |
| . | . |
| . | . |
| . | . |

<Example 6-2> Method of Determining Weights According to the Number of Newly Rearranged Reference Samples As described in Example 1-2, as the number of rearranged reference samples increases, coding or decoding efficiency in the reverse order is improved. Therefore, in the present example, a value of the weight B is set to be larger as the value of numNew increases. For example, when the value of numNew is 4, the weights A and B may be set to (½, ½), and when numNew is 8, the weights A and B may be set to (¼, ¾).

<Example 6-3> Method of Determining Weights According to a Ratio of Newly Restored Reference Samples As described in Example 1-3, when a ratio of the rearranged reference samples to the number of pre-restored reference samples is higher, the coding efficiency in the reverse order is improved. Therefore, in the present example, As the value of newRatio increases, the value of the weight B is set higher. For example, when the value of newRatio is 0.5, the weights A and B are set to (½, ½), and when the value of newRatio is 0.875, the weights A and B are set to (⅛, ⅞).

<Example 7> Method of Correcting Predictor in Decoding Order

When a predictor of the current block is generated and only reference samples of one side is used, discontinuity may be noticeable at a boundary of the other side. For example, when the direction of the intra prediction mode is the top-right direction, the predictor is generated with reference samples on the top, but reference samples on the left are not involved in generating the predictor, and thus, the discontinuity may be noticeable at a left boundary. As a technology for reducing such discontinuity, a Position Dependent Prediction Combination (PDPC) technology is known as a technology showing high performance in removing the discontinuity appearing at a boundary of a block when intra prediction is performed.

Figure 16:
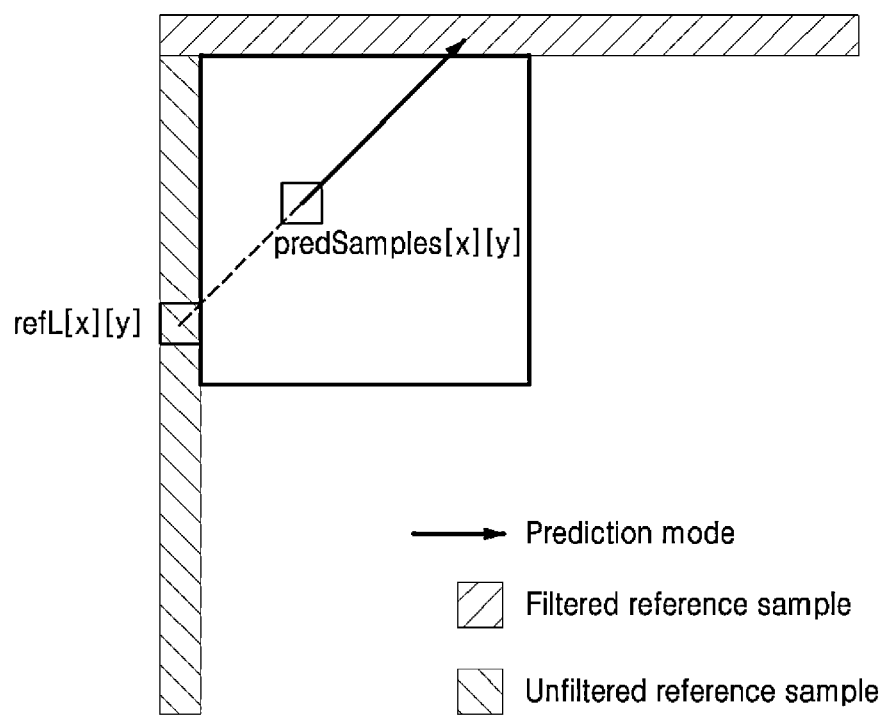
FIG. 16 is an illustrative diagram illustrating a Position Dependent Prediction Combination (PDPC) technology.

FIG. 16 is an illustrative diagram illustrating a PDPC technology.

The PDPC performs weighted sum on filtered reference samples and unfiltered reference samples to correct an intra predictor. As illustrated in FIG. 16, the PDPC performs a weighted sum on a predictor (i.e., predSamples[x][y]) acquired from a filtered reference sample (i.e., a reference sample referred to by a current pixel according to the prediction mode) and an unfiltered reference sample (i.e., a reference sample refL[x][y]) in an opposite direction of the prediction mode) to reduce the above-described discontinuity. In this case, as the current pixel is further away from the unfiltered reference sample, the weight for the unfiltered reference sample decreases.

In the VVC technology, PDPC is applied when all conditions shown in Table 6 are satisfied.

TABLE 6

<Application conditions for PDPC>

| | |
|---|---|
| (Condition 1) Width ≥ 4 and Height ≥ 4 | |
| (Condition 2) refIdx = 0 | //Always true when ISP is applied |
| (Condition 3) When BDPCM is not used | //Always true when ISP is applied |
| (Condition 4) (predModeIntra ≤ 18) or (predModeIntra ≥ 50) | |

In table 6, Width and Height represent a width and height of the current block, respectively, refIdx represents a reference line index, and predModeIntra represents the intra prediction mode. When the ISP is applied, refIdx is always 0, and BDPCM is not used. Further, when the ISP technology is applied, PDPC is applied to subblocks other than the current block, and as Width and Height in (condition 1), a width and height of each subblock are applied. For example, when the width of the current block is 8 and the height is 8, and ISP of the partition in the horizontal direction is applied, the width of each subblock is 8, but the height is 2, PDPC application condition 1 is not satisfied, and thus, PDPC is not applied. As another example, when the width of the current block is 16 and the height is 16, and the ISP of the partition in the vertical direction is applied, the width of each subblock is 4 and the height is 16, and thus condition 1 is satisfied. Nevertheless, when the prediction mode is Number 35, (condition 4) is not satisfied, and thus, PDPC is not applied.

Figure 17:
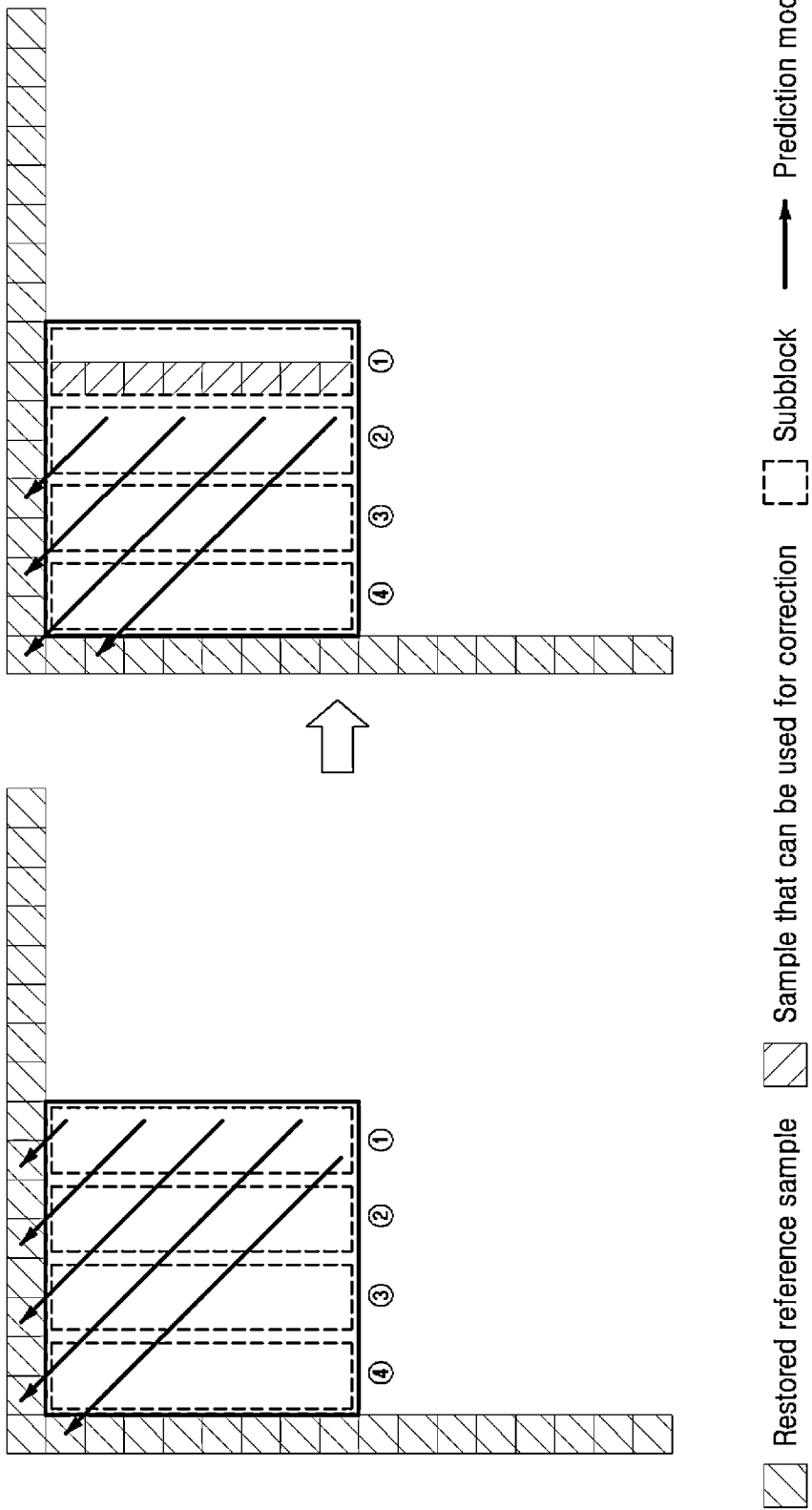
FIG. 17 is an illustrative diagram illustrating decoding of the subblocks using the reverse order according to another embodiment of the present disclosure.

In a case in which the decoding order of the subblocks is determined in the reverse order, the prediction mode may not satisfy (Condition 4) even when the size of each subblock satisfies the PDPC application condition. In this case, even though the predictor of each subblock can be corrected using PDPC as illustrated in the example of FIG. 17, the PDPC technology of the related art does not correct the subblock predictor. Thus, an increase in the prediction efficiency due to the use of the reverse order may be insignificant.

Figure 18:
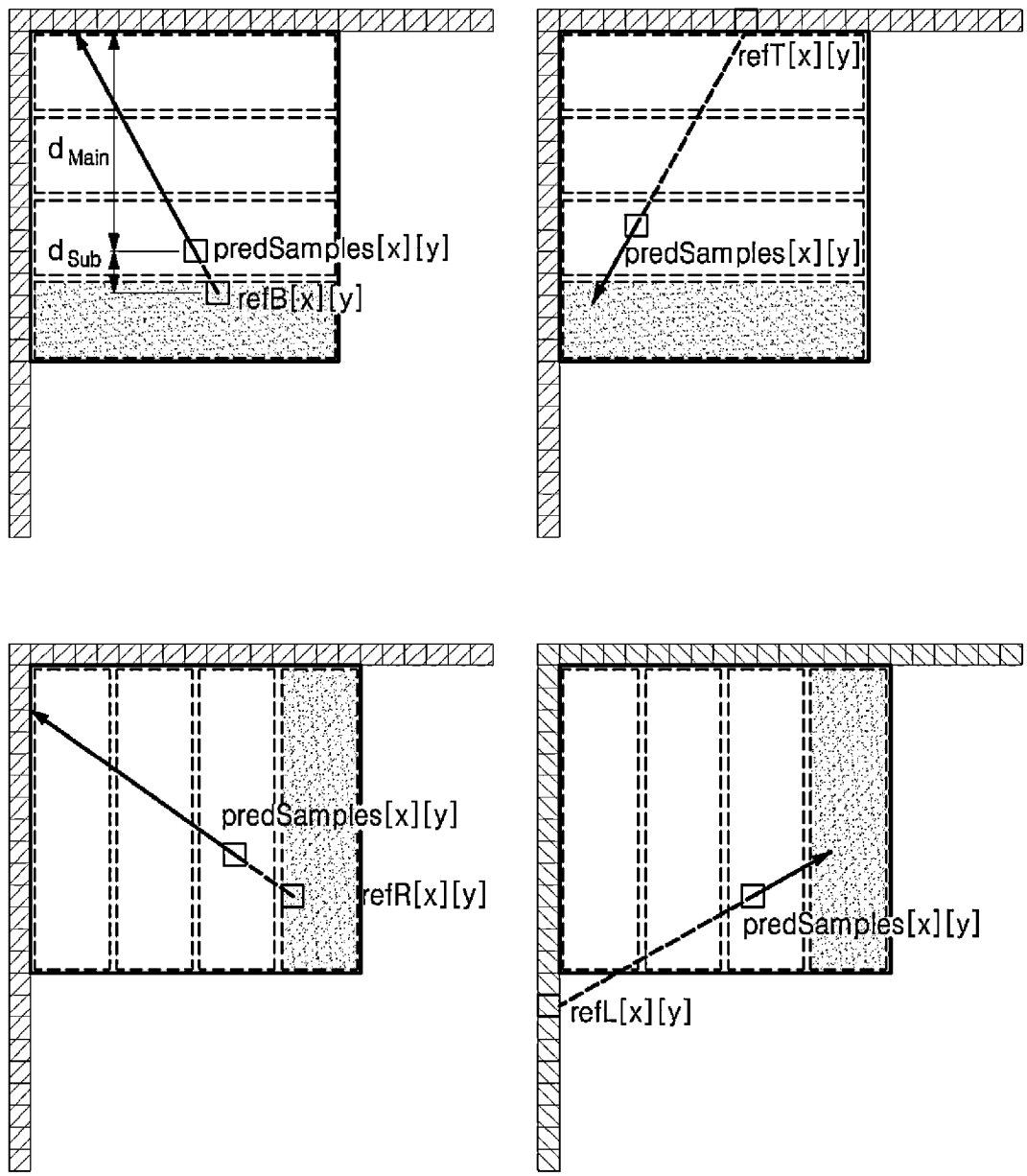
FIG. 18 is an illustrative diagram illustrating decoding of the subblocks using the reverse order according to another embodiment of the present disclosure.

FIG. 18 is an illustrative diagram illustrating decoding of the subblocks using the reverse order according to another embodiment of the present disclosure.

This example relates to a method of generating a predictor of a subblock when the subblocks are decoded in reverse order in order to further improve prediction efficiency by using pixels in a previously decoded subblock. As illustrated in FIG. 18, the present example can be applied to subsequent subblocks to be decoded except for a subblock to be first decoded.

In this example, according to the sub-splitting direction of the ISP and the intra prediction mode, refL[x][y] illustrated in FIG. 16 may be replaced with refB [x][y], refT[x][y], refR[x][y], and refL[x][y] illustrated in FIG. 18. A predictor of each subblock may be generated through a weighted sum of predSamples and refX(X∈{B,T,R,L}). Here, refX represents a reference sample in the opposite direction to the prediction mode.

A weighted sum method may follow a PDPC method of the related art. Alternatively, predSamples and refX may be subjected to the weighted sum based on a distance between the position of the predictor and the position of reference samples. For example, as in the first example of FIG. 18, when a distance ratio to the position of the reference samples is $d_{Main}$:$d_{Sub}$, predSamples may be generated as in Equation 2.

$$predSamples = \frac{d_{Sub}}{d_{Main} + d_{Sub}} \cdot predSamples + \frac{d_{Main}}{d_{Main} + d_{Sub}} \cdot refX \quad \text{Equation 2}$$

In Equation 2, $d_{Main}$ represents a distance from the current pixel to a reference pixel indicated by the prediction mode, and $d_{Sub}$ represents a distance from the current pixel to a reference pixel in the opposite direction of the prediction mode.

Although the steps or operations in the respective flowcharts are described to be sequentially performed, the steps or operations merely instantiate the technical idea of some embodiments of the present disclosure. Therefore, a person having ordinary skill in the art to which the present disclosure pertains should readily understand that the steps or operations may be performed by changing the sequences described in the respective drawings and/or two or more of the steps or operations may be performed in parallel. Hence, the steps in the respective flowcharts are not limited to the illustrated chronological sequences.

It should be understood that the above description presents illustrative embodiments that may be implemented in various other manners. The functions described in various embodiments may be realized by hardware, software, firmware, and/or their combination. It should also be understood that the functional components described in this specification are labeled by " . . . unit" to strongly emphasize the possibility of their independent realization.

Various methods or functions described above, according to some embodiments, may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which this disclosure pertains should understand that the scope of the present disclosure is not to be limited by the above explicitly described embodiments but by the claims and equivalents thereof.

REFERENCE NUMERALS

122: intra predictor
510: entropy decoder
542: intra predictor

What is claimed is:

1. An intra prediction method for subblocks split from a current block, performed by a video decoding apparatus, the intra prediction method comprising:
   decoding a subblock partition direction flag, an intra prediction mode of the current block, and a size of the current block from a bitstream, the subblock partition direction flag indicating whether a sub-splitting direction of the current block is a horizontal direction or a vertical direction;
   inputting the subblock partition direction flag, the intra prediction mode of the current block, and the size of the current block to an order determiner;
   determining a decoding order of the subblocks by selecting one of a default order and a reverse order according to an order determination flag generated by the order determiner;
   generating the subblocks by splitting the current block based on the subblock partition direction flag and the size of the current block; and
   generating a predictor of each subblock by applying the intra prediction mode to the subblocks in the decoding order,
   wherein, when the reverse order is used as the decoding order, the intra prediction method further includes:
      determining, by the order determiner, rearranged reference samples additionally referable to by the subblocks,
   wherein the rearranged reference samples include at least some of reference samples on a bottom of each subblock and are added to a bottom of reference samples on a right side of each subblock when the intra prediction mode is a bottom-left prediction mode in which a preset first mode offset is considered, and
   wherein the rearranged reference samples include at least some of the reference samples on the right side of each subblock and are added to a right side of the reference samples on a top of each subblock when the intra prediction mode is a top-right prediction mode in which a preset second mode offset is considered.

2. The intra prediction method of claim 1, wherein
   the default order is a subblock decoding order from left to right when the subblocks are split in the vertical direction, and is a subblock decoding order from top to bottom when the subblocks are split in the horizontal direction, and
   the reverse order is a subblock decoding order from right to left when the subblocks are split in the vertical direction, and is a subblock decoding order from bottom to top when the subblocks are split in the horizontal direction.

3. The intra prediction method of claim 1, wherein determining the decoding order includes:
   determining the reverse order as the decoding order when the order determination flag is 1, and determining the default order as the decoding order when the order determination flag is 0.

4. The intra prediction method of claim 1, wherein determining the rearranged reference samples includes:
   calculating, by the order determiner, a number of the rearranged reference samples additionally referable to by the subblocks based on the size of the current block and the intra prediction mode.

5. The intra prediction method of claim 4, further comprising: determining, by the order determiner, the order determination flag to be 1 for a subblock split in the horizontal direction when the intra prediction mode is a bottom-left prediction mode in which a preset first mode offset is considered and the number of the rearranged reference samples is equal to or greater than a preset threshold value.

6. The intra prediction method of claim 4, further comprising: determining, by the order determiner, the order determination flag to be 1 for a subblock split in the vertical direction when the intra prediction mode is a top-right prediction mode in which a preset second mode offset is considered and the number of rearranged reference samples is equal to or greater than a preset threshold value.

7. The intra prediction method of claim 1, wherein determining the rearranged reference samples includes:
   calculating, by the order determiner, a ratio of the rearranged reference samples additionally referable to by the subblocks based on a size of the subblocks and the intra prediction mode, the size of the subblocks being calculated using the size of the current block and the subblock partition direction flag.

8. The intra prediction method of claim 7, wherein the ratio of the rearranged reference samples is a value obtained by dividing a number of rearranged reference samples by the number of samples corresponding to a width of the subblocks when the subblocks are split in the vertical direction, and is a value obtained by dividing the number of rearranged reference samples by the number of samples corresponding to a height of the subblocks when the subblocks are split in the horizontal direction.

9. The intra prediction method of claim 7, further comprising: determining, by the order determiner, the order determination flag to be 1 for a subblock split in the horizontal direction when the intra prediction mode is a bottom-left prediction mode in which a preset first mode offset is considered and the ratio of the rearranged reference samples is greater than or equal to a preset threshold ratio.

10. The intra prediction method of claim 7, further comprising: determining, by the order determiner, the order determination flag to be 1 for a subblock split in the vertical direction when the intra prediction mode is a top-right prediction mode in which a preset second mode offset is considered and the ratio of the rearranged reference samples is greater than or equal to a preset threshold ratio.

11. An intra prediction method for subblocks split from a current block, performed by a video encoding apparatus, the intra prediction method comprising:
  acquiring a subblock partition direction flag, an intra prediction mode of the current block, and a size of the current block from a high level, the subblock partition direction flag indicating whether a sub-splitting direction of the current block is a horizontal direction or a vertical direction;
  inputting the subblock partition direction flag, the intra prediction mode of the current block, and the size of the current block to an order determiner, and determining an encoding order of the subblocks by selecting one of a default order and a reverse order according to an order determination flag generated by the order determiner;
  generating the subblocks by splitting the current block based on the subblock partition direction flag and the size of the current block; and
  generating a predictor of each subblock by applying the intra prediction mode to the subblocks in the encoding order,
  wherein, when the reverse order is used as a decoding order, the intra prediction method further comprises:
    determining, by the order determiner, rearranged reference samples additionally referable to by the subblocks,
  wherein the rearranged reference samples include at least some of reference samples on a bottom of each subblock and are added to a bottom of reference samples on a right side of each subblock when the intra prediction mode is a bottom-left prediction mode in which a preset first mode offset is considered,
  wherein the rearranged reference samples include at least some of the reference samples on the right side of each subblock and are added to a right side of the reference samples on a top of each subblock when the intra prediction mode is a top-right prediction mode in which a preset second mode offset is considered.

12. The intra prediction method of claim 11, wherein the reverse order is a subblock encoding order from right to left when the subblocks are split in the vertical direction, and is a subblock encoding order from bottom to top when the subblocks are split in the horizontal direction.

13. The intra prediction method of claim 11, wherein determining the encoding order includes:
  determining the reverse order as the encoding order when the order determination flag is 1, and determining the default order as the encoding order when the order determination flag is zero (0).

14. A method for providing video data to a video decoding device, the method comprising:
  encoding the video data into a bitstream; and
  transmitting the bitstream to the video decoding device,
  wherein encoding the video data comprises:
    acquiring a subblock partition direction flag, an intra prediction mode of a current block, and a size of the current block from a high level, the subblock partition direction flag indicating whether a sub-splitting direction of the current block is a horizontal direction or a vertical direction;
    inputting the subblock partition direction flag, the intra prediction mode of the current block, and the size of the current block to an order determiner, and determining an encoding order of subblocks by selecting one of a default order and a reverse order according to an order determination flag generated by the order determiner;
    generating the subblocks by splitting the current block based on the subblock partition direction flag and the size of the current block; and
    generating a predictor of each subblock by applying the intra prediction mode to the subblocks in the encoding order,
  wherein, when the reverse order is used as a decoding order, the method further comprises:
    determining, by the order determiner, rearranged reference samples additionally referable to by the subblocks,
  wherein the rearranged reference samples include at least some of reference samples on a bottom of each subblock and are added to a bottom of reference samples on a right side of each subblock when the intra prediction mode is a bottom-left prediction mode in which a preset first mode offset is considered, and
  wherein the rearranged reference samples include at least some of the reference samples on the right side of each subblock and are added to a right side of the reference samples on a top of each subblock when the intra prediction mode is a top-right prediction mode in which a preset second mode offset is considered.

* * * * *